(12) United States Patent
Sasaki et al.

(10) Patent No.: US 8,587,899 B1
(45) Date of Patent: Nov. 19, 2013

(54) MAGNETIC HEAD FOR PERPENDICULAR MAGNETIC RECORDING HAVING A BOTTOM SHIELD INCLUDING A BASE PART AND A PROTRUDING PART

(75) Inventors: Yoshitaka Sasaki, Santa Clara, CA (US); Hiroyuki Ito, Milpitas, CA (US); Kazuki Sato, Milpitas, CA (US); Hironori Araki, Milpitas, CA (US); Shigeki Tanemura, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/594,411

(22) Filed: Aug. 24, 2012

(51) Int. Cl.
   *G11B 5/127* (2006.01)
   *G11B 5/187* (2006.01)

(52) U.S. Cl.
   USPC ............. 360/125.13; 360/125.16; 360/125.27

(58) Field of Classification Search
   USPC ............... 360/125.1, 125.11, 125.13, 125.14, 360/125.15, 125.16, 125.25, 125.26, 125.27
   See application file for complete search history.

(56) References Cited

U.S. PATENT DOCUMENTS

| | | | |
|---|---|---|---|
| 6,954,340 B2 | 10/2005 | Shukh et al. | |
| 8,194,510 B2 * | 6/2012 | Sasaki et al. | 369/13.33 |
| 8,233,235 B2 * | 7/2012 | Chen et al. | 360/125.15 |
| 8,274,759 B1 * | 9/2012 | Sasaki et al. | 360/125.13 |
| 8,295,008 B1 * | 10/2012 | Sasaki et al. | 360/125.02 |
| 8,323,727 B2 * | 12/2012 | Pentek et al. | 427/129 |
| 8,345,381 B1 * | 1/2013 | Sasaki et al. | 360/123.03 |
| 8,345,384 B1 * | 1/2013 | Sasaki et al. | 360/125.15 |
| 2005/0128637 A1 | 6/2005 | Johnston et al. | |
| 2009/0059426 A1 * | 3/2009 | Sasaki et al. | 360/125.02 |
| 2012/0188666 A1 * | 7/2012 | Sasaki et al. | 360/123.12 |

* cited by examiner

*Primary Examiner* — Brian Miller
(74) *Attorney, Agent, or Firm* — Oliff & Berridge, PLC

(57) ABSTRACT

A magnetic head includes a coil, a main pole, a write shield, and a return path section. The write shield includes a bottom shield located on the rear side in the direction of travel of a recording medium relative to the main pole. The return path section is located on the rear side in the direction of travel of the recording medium relative to the main pole and connects the bottom shield and part of the main pole away from a medium facing surface so as to define a space through which part of the coil passes. The return path section is not exposed in the medium facing surface. The bottom shield includes a base part, and a protruding part protruding from the base part toward the main pole. The base part is greater than the protruding part in length in a direction perpendicular to the medium facing surface.

10 Claims, 20 Drawing Sheets

MAGNETIC HEAD FOR PERPENDICULAR MAGNETIC RECORDING HAVING A BOTTOM SHIELD INCLUDING A BASE PART AND A PROTRUDING PART

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in the direction perpendicular to the plane of a recording medium. The main pole includes, for example, a track width defining portion having an end located in a medium facing surface that faces a recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For achieving higher recording density, it is necessary to prevent adjacent track erasure.

Providing a write shield near the main pole is effective for preventing adjacent track erasure induced by the skew mentioned above and increasing the recording density. For example, U.S. Pat. No. 6,954,340 B2 and U.S. Patent Application Publication No. 2005/0128637 A1 each disclose a magnetic head including a write shield having an end face that is located in the medium facing surface to wrap around an end face of the main pole.

A magnetic head including a write shield is typically provided with one or more return path sections for connecting the write shield and part of the main pole away from the medium facing surface to each other. The write shield and the one or more return path sections have the function of capturing a magnetic flux that is produced from the end face of the main pole and spreads in directions other than the direction perpendicular to the plane of the recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head including the write shield makes it possible to prevent adjacent track erasure and allows a further improvement of the recording density.

U.S. Pat. No. 6,954,340 B2 and U.S. Patent Application Publication No. 2005/0128637 A1 each disclose a magnetic head including, as the aforementioned one or more return path sections, a return path section located on the trailing side relative to the main pole and a return path section located on the leading side relative to the main pole.

Now, the configuration of the return path section located on the leading side relative to the main pole (hereinafter, referred to as the leading return path section) will be contemplated. In a magnetic head, the read head section and the write head section stacked on the top surface of the substrate are typically located on the trailing side relative to the top surface of the substrate. In this case, the leading return path section is interposed between the main pole and the top surface of the substrate. The main pole and the leading return path section define a space through which a portion of a coil passes. In such a magnetic head, the leading return path section is typically configured to have a first layer, a second layer formed on the first layer at a position near the medium facing surface, and a third layer formed on the first layer at a position away from the medium facing surface. The second layer connects a part of the first layer located near the medium facing surface to the write shield. The third layer connects a part of the first layer located away from the medium facing surface to a part of the main pole located away from the medium facing surface.

In the magnetic head shown in FIG. 8 of U.S. Patent Application Publication No. 2005/0128637 A1, a return pole located on the leading side relative to the main pole corresponds to the aforementioned first layer, a shorting shield located on the leading side relative to the main pole corresponds to part of the write shield and the aforementioned second layer, and a back via located on the leading side relative to the main pole corresponds to the aforementioned third layer.

In the typical configuration of the leading return path section described above, the second layer is much longer in the direction of travel of the recording medium than in the direction perpendicular to the medium facing surface, and an end face of the second layer is exposed over a large area in the medium facing surface. When the second layer has such a configuration, part of the magnetic flux captured into the second layer from a part of the end face of the second layer located near the end face of the main pole may leak from another part of the end face of the second layer toward the recording medium. This may result in the occurrence of adjacent track erasure.

Furthermore, when the leading return path section has the typical configuration described above, heat generated by the coil may cause expansion of the second layer and an insulating layer surrounding the coil, and thereby cause the end face of the second layer to protrude toward the recording medium. The protrusion of the end face of the second layer causes the end face of the main pole and an end of the read head section located in the medium facing surface to get farther from the recording medium, and this may result in degradation of the read and write characteristics.

OBJECT AND SUMMARY OF THE INVENTION

It is an object of the present invention to provide a magnetic head for perpendicular magnetic recording and its manufacturing method that can avoid the problems resulting from a configuration in which an end face of a return path section located on the rear side in the direction of travel of a recording medium relative to the main pole is exposed over a large area in the medium facing surface.

A magnetic head for perpendicular magnetic recording of the present invention includes: a medium facing surface that faces a recording medium; a coil; a main pole; a write shield made of a magnetic material; a gap part, made of a nonmagnetic material; a first return path section made of a magnetic material; and a substrate having a top surface. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The write shield has an end face located in the medium facing surface. The gap part is interposed between the main pole and the write shield. The coil, the main pole, the write shield, the gap part, and the first return path section are located above the top surface of the substrate.

The write shield includes a bottom shield that is located on the rear side in the direction of travel of the recording medium relative to the main pole. The bottom shield has an end face that is located in the medium facing surface at a position on the rear side in the direction of travel of the recording medium relative to the end face of the main pole. The first return path section is located on the rear side in the direction of travel of the recording medium relative to the main pole and interposed between the main pole and the top surface of the substrate. The first return path section connects the bottom shield and part of the main pole away from the medium facing surface to each other so that a first space is defined by the main pole, the gap part, the bottom shield, and the first return path section. The coil includes a first portion passing through the first space.

The first return path section includes a yoke layer, a first coupling portion, and a second coupling portion. The yoke layer is located closer to the top surface of the substrate than is the first space. The first coupling portion is interposed between the first space and the medium facing surface without being exposed in the medium facing surface, and magnetically couples the bottom shield and the yoke layer to each other. The second coupling portion is located farther from the medium facing surface than is the first space, and magnetically couples the main pole and the yoke layer to each other.

The bottom shield includes a base part, and a protruding part that protrudes from the base part toward the main pole. The base part is magnetically connected to the first coupling portion. In a cross section that intersects the end face of the main pole located in the medium facing surface and that is perpendicular to the medium facing surface and to the top surface of the substrate, the base part is greater than the protruding part in length in a direction perpendicular to the medium facing surface.

The base part has a top surface facing toward the main pole. The protruding part has a rear end face located opposite to the medium facing surface. The top surface of the base part is located farther from the medium facing surface than is the rear end face of the protruding part, and is contiguous with the rear end face. The rear end face of the protruding part forms an angle relative to the direction perpendicular to the medium facing surface, the angle being greater than an angle that the top surface of the base part forms relative to the direction perpendicular to the medium facing surface.

In the magnetic head for perpendicular magnetic recording of the present invention, the angle that the top surface of the base part forms relative to the direction perpendicular to the medium facing surface may fall within the range of 0° to 20°, and the angle that the rear end face of the protruding part forms relative to the direction perpendicular to the medium facing surface may fall within the range of 50° to 90°.

In the magnetic head for perpendicular magnetic recording of the present invention, the protruding part may further have an inclined surface that is located closer to the medium facing surface than is the rear end face and contiguous with the rear end face. In this case, the inclined surface may form an angle relative to the direction perpendicular to the medium facing surface, the angle being smaller than the angle that the rear end face forms relative to the direction perpendicular to the medium facing surface. In this case, the angle that the top surface of the base part forms relative to the direction perpendicular to the medium facing surface may fall within the range of 0° to 20°, the angle that the rear end face of the protruding part forms relative to the direction perpendicular to the medium facing surface may fall within the range of 50° to 65°, and the angle that the inclined surface of the protruding part forms relative to the direction perpendicular to the medium facing surface may fall within the range of 30° to 45°.

In the magnetic head for perpendicular magnetic recording of the present invention, the write shield may further include a top shield. The top shield has an end face that is located in the medium facing surface at a position on the front side in the direction of travel of the recording medium relative to the end face of the main pole. In this case, the magnetic head may further include a second return path section made of a magnetic material. The second return path section is located on the front side in the direction of travel of the recording medium relative to the main pole, and connects the top shield and part of the main pole away from the medium facing surface to each other so that a second space is defined by the main pole, the gap part, the top shield, and the second return path section. The coil may further include a second portion passing through the second space.

In the magnetic head for perpendicular magnetic recording of the present invention, the write shield may further include first and second side shields and a top shield. The first and second side shields have two end faces that are located in the medium facing surface at positions on opposite sides of the end face of the main pole in a track width direction. The top shield has an end face that is located in the medium facing surface at a position on the front side in the direction of travel of the recording medium relative to the end face of the main pole.

A method of manufacturing the magnetic head for perpendicular magnetic recording of the present invention includes the steps of forming the first return path section, forming the coil, forming the main pole, forming the write shield, and forming the gap part. The step of forming the write shield includes the step of forming the bottom shield. The step of forming the bottom shield includes the step of forming a magnetic layer and the step of etching the magnetic layer so as to provide the magnetic layer with the top surface of the base part and the rear end face of the protruding part so that the magnetic layer becomes the bottom shield.

In the method of manufacturing the magnetic head for perpendicular magnetic recording of the present invention, the angle that the top surface of the base part forms relative to the direction perpendicular to the medium facing surface may fall within the range of 0° to 20°, and the angle that the rear end face of the protruding part forms relative to the direction perpendicular to the medium facing surface may fall within the range of 50° to 90°.

In the method of manufacturing the magnetic head for perpendicular magnetic recording of the present invention, the protruding part may further have an inclined surface that is located closer to the medium facing surface than is the rear end face and contiguous with the rear end face. In this case, the inclined surface may form an angle relative to the direction perpendicular to the medium facing surface, the angle being smaller than the angle that the rear end face forms relative to the direction perpendicular to the medium facing surface. Further, in this case, the step of etching the magnetic layer may provide the magnetic layer with the inclined surface of the protruding part in addition to the top surface of the base part and the rear end face of the protruding part. Further, in this case, the angle that the top surface of the base part forms relative to the direction perpendicular to the medium facing surface may fall within the range of 0° to 20°, the angle that the rear end face of the protruding part forms relative to the direction perpendicular to the medium facing surface may fall within the range of 50° to 65°, and the angle that the inclined surface of the protruding part forms relative to the direction perpendicular to the medium facing surface may fall within the range of 30° to 45°.

In the magnetic head for perpendicular magnetic recording and the method of manufacturing the same of the present invention, the bottom shield includes the base part and the protruding part, and the base part is greater than the protruding part in length in the direction perpendicular to the medium facing surface in the cross section that intersects the end face of the main pole located in the medium facing surface and that is perpendicular to the medium facing surface and to the top surface of the substrate. According to the present invention, it is thus possible to connect the first return path section to the bottom shield while avoiding exposure of the first coupling portion of the first return path section in the medium facing surface. Consequently, the present invention makes it possible to avoid the problems that would result from the configuration in which an end face of the return path section located on the rear side in the direction of travel of the recording medium relative to the main pole is exposed over a large area in the medium facing surface.

Further, according to the present invention, since the bottom shield includes the base part and the protruding part, it is possible to manufacture the magnetic head in a smaller number of steps than in a case where the base part and the protruding part are composed of different layers.

Other objects, features and advantages of the present invention will become fully apparent from the following description.

DETAILED DESCRIPTION OF THE PREFERRED EMBODIMENT

Figure 1:
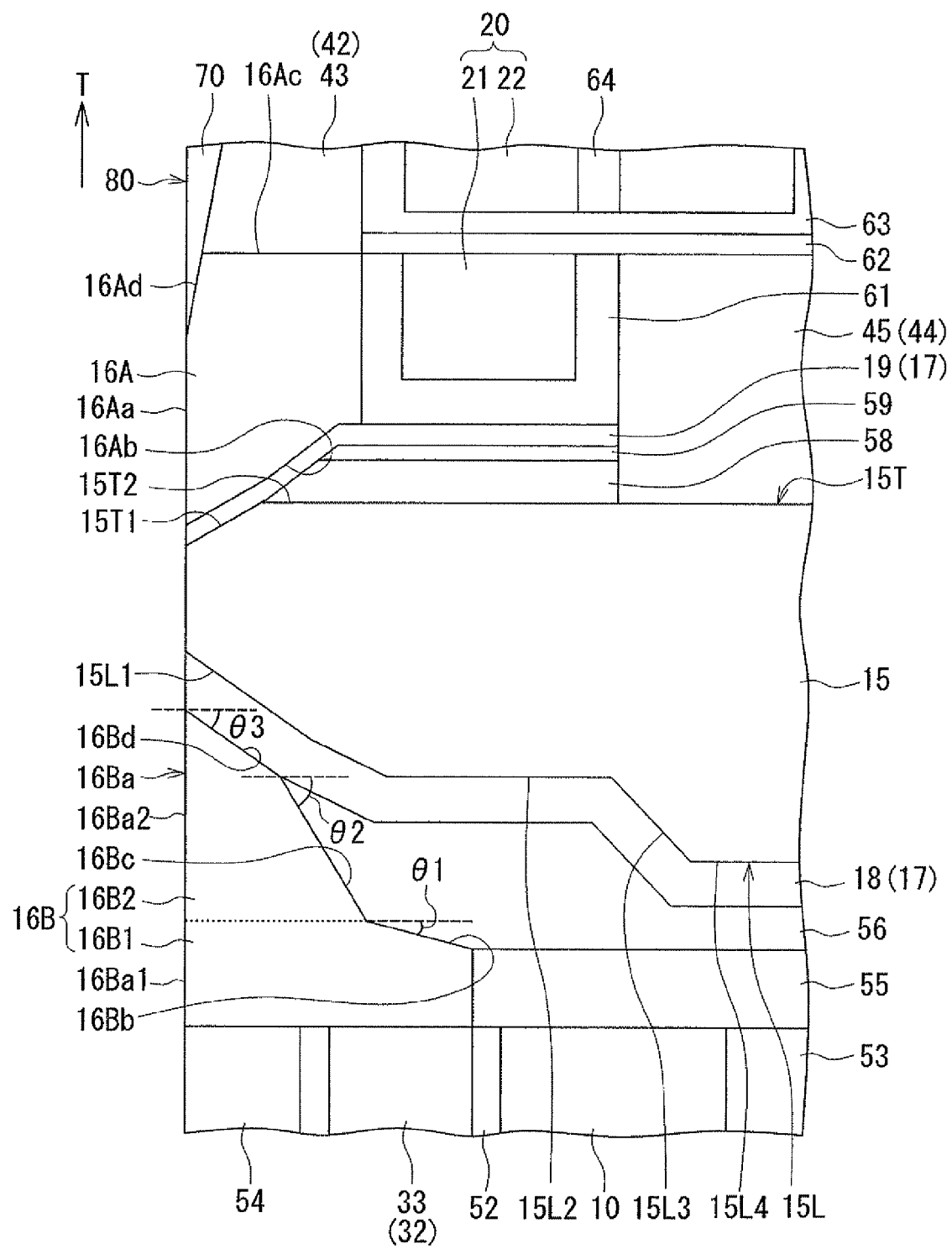
FIG. 1 is a cross-sectional view showing a write shield and a portion of a main pole in the vicinity of the medium facing surface in a magnetic head according to an embodiment of the invention.
Figure 2:
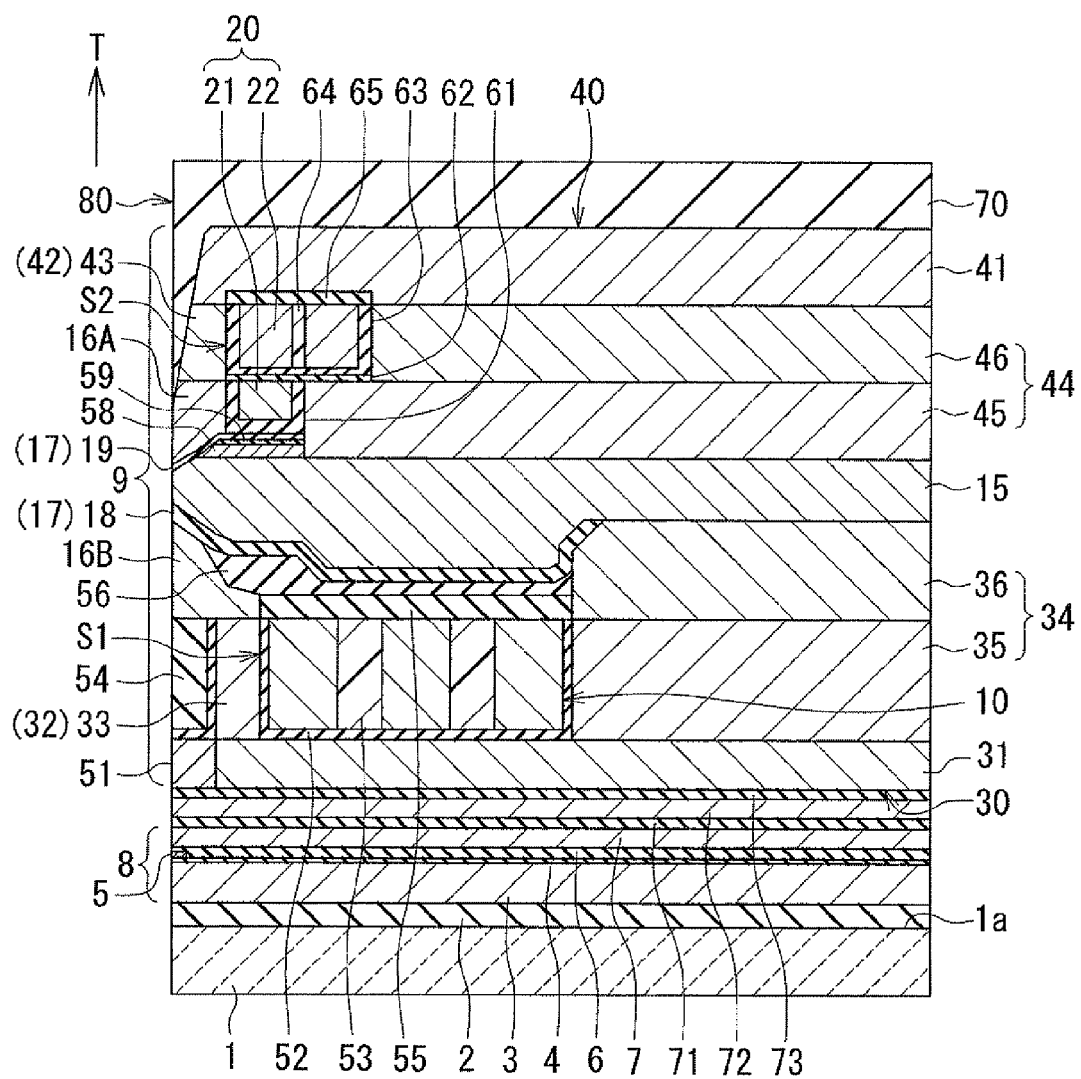
FIG. 2 is a cross-sectional view of the magnetic head according to the embodiment of the invention.
Figure 3:
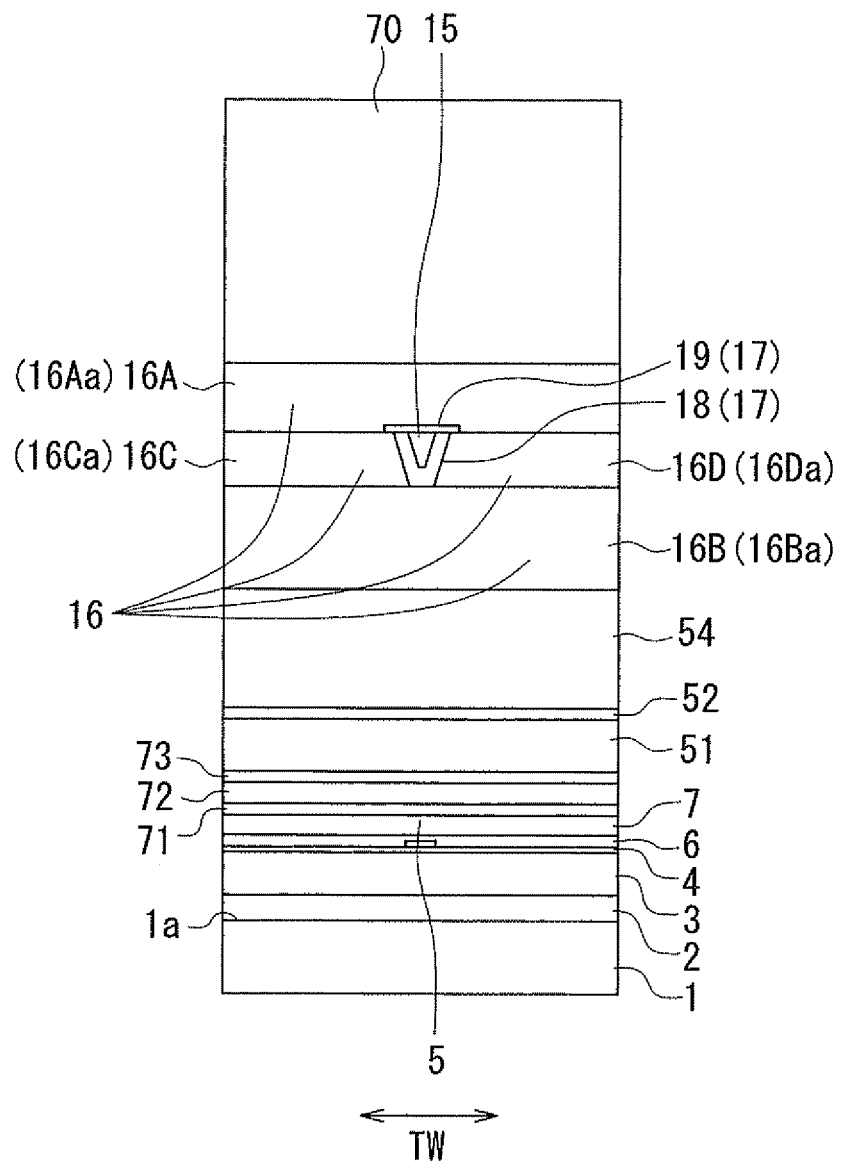
FIG. 3 is a front view showing the medium facing surface of the magnetic head according to the embodiment of the invention.
Figure 4:
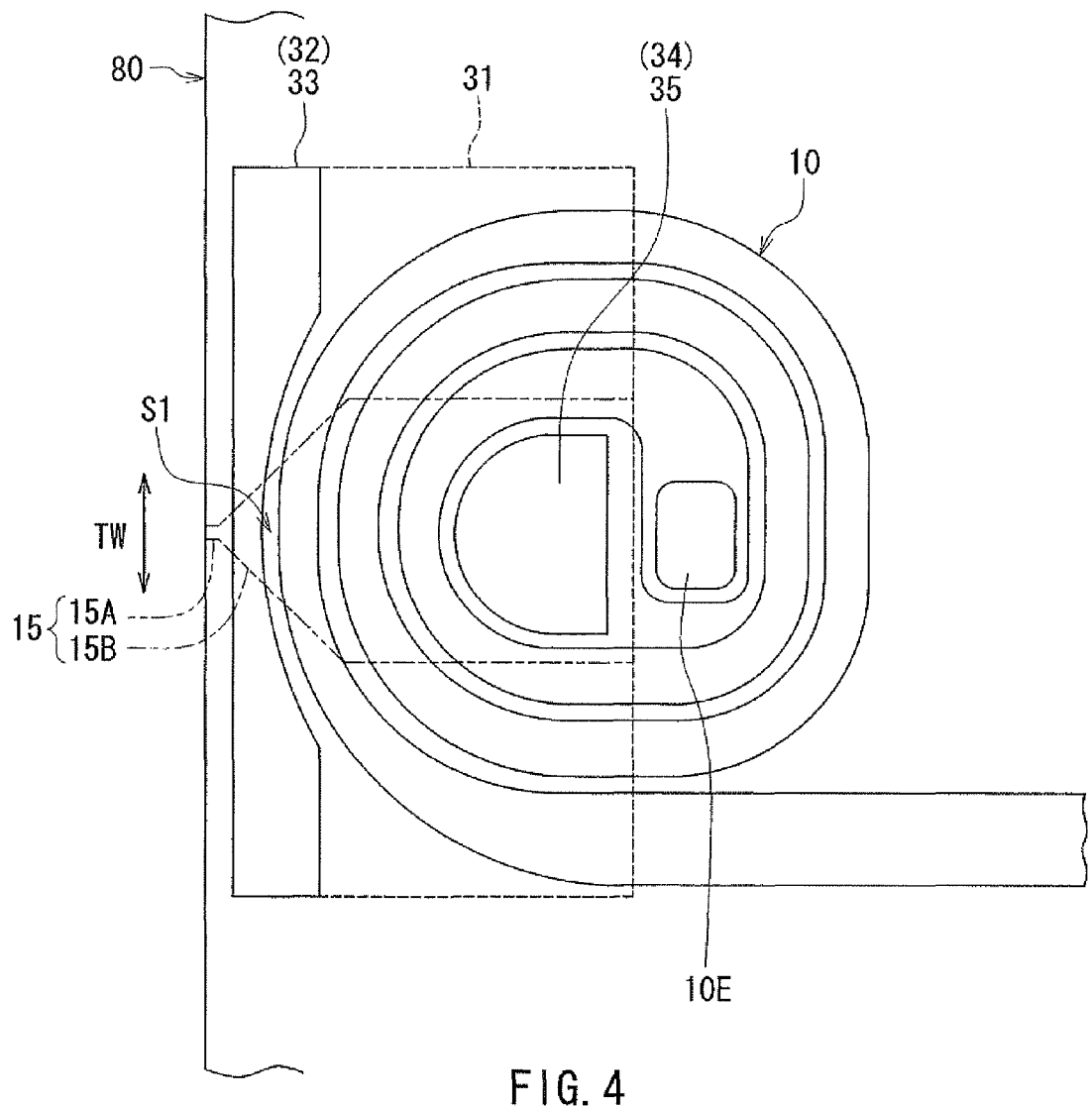
FIG. 4 is a plan view showing a first portion of a coil of the magnetic head according to the embodiment of the invention.
Figure 5:
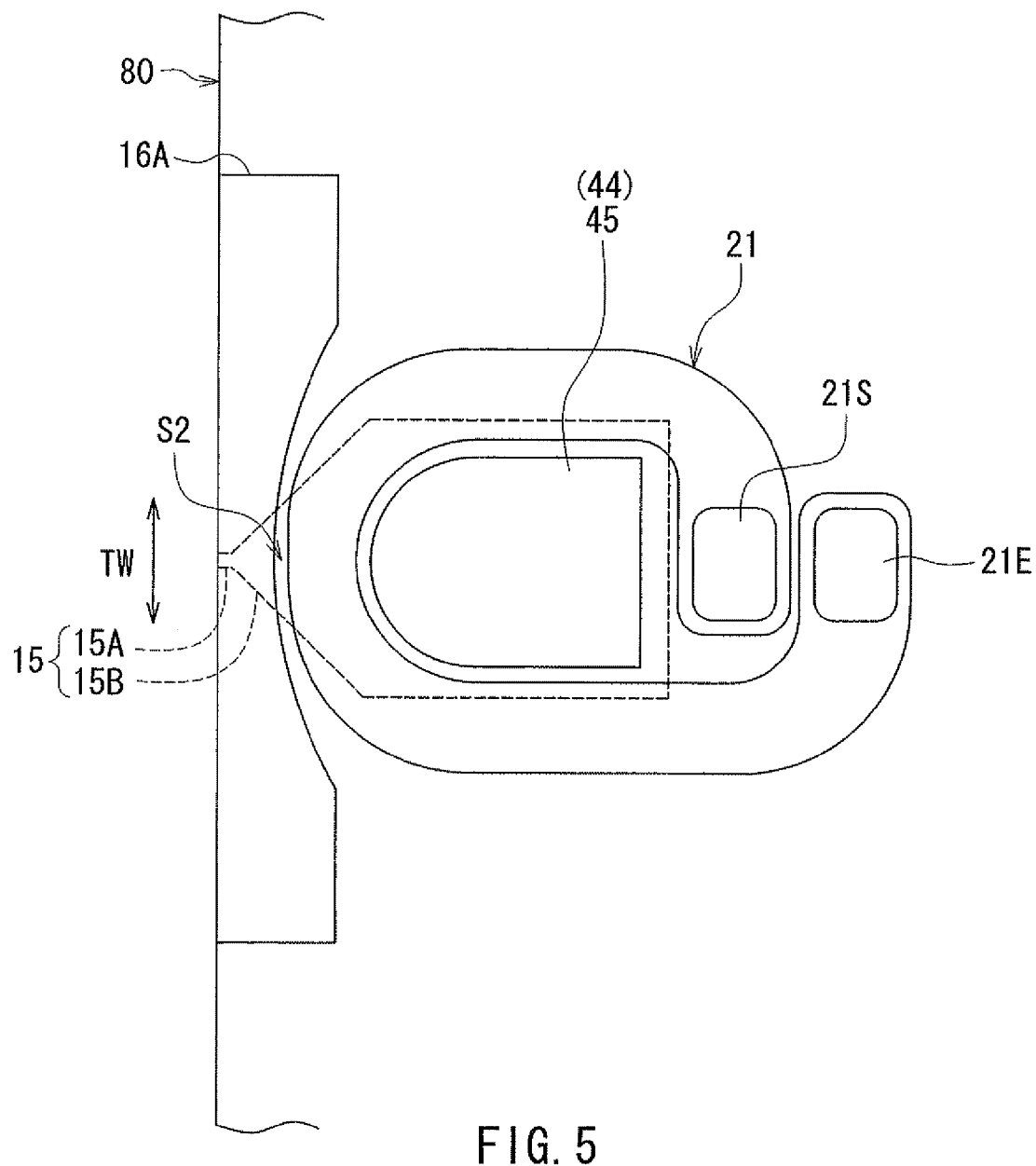
FIG. 5 is a plan view showing a first layer of a second portion of the coil of the magnetic head according to the embodiment of the invention.
Figure 6:
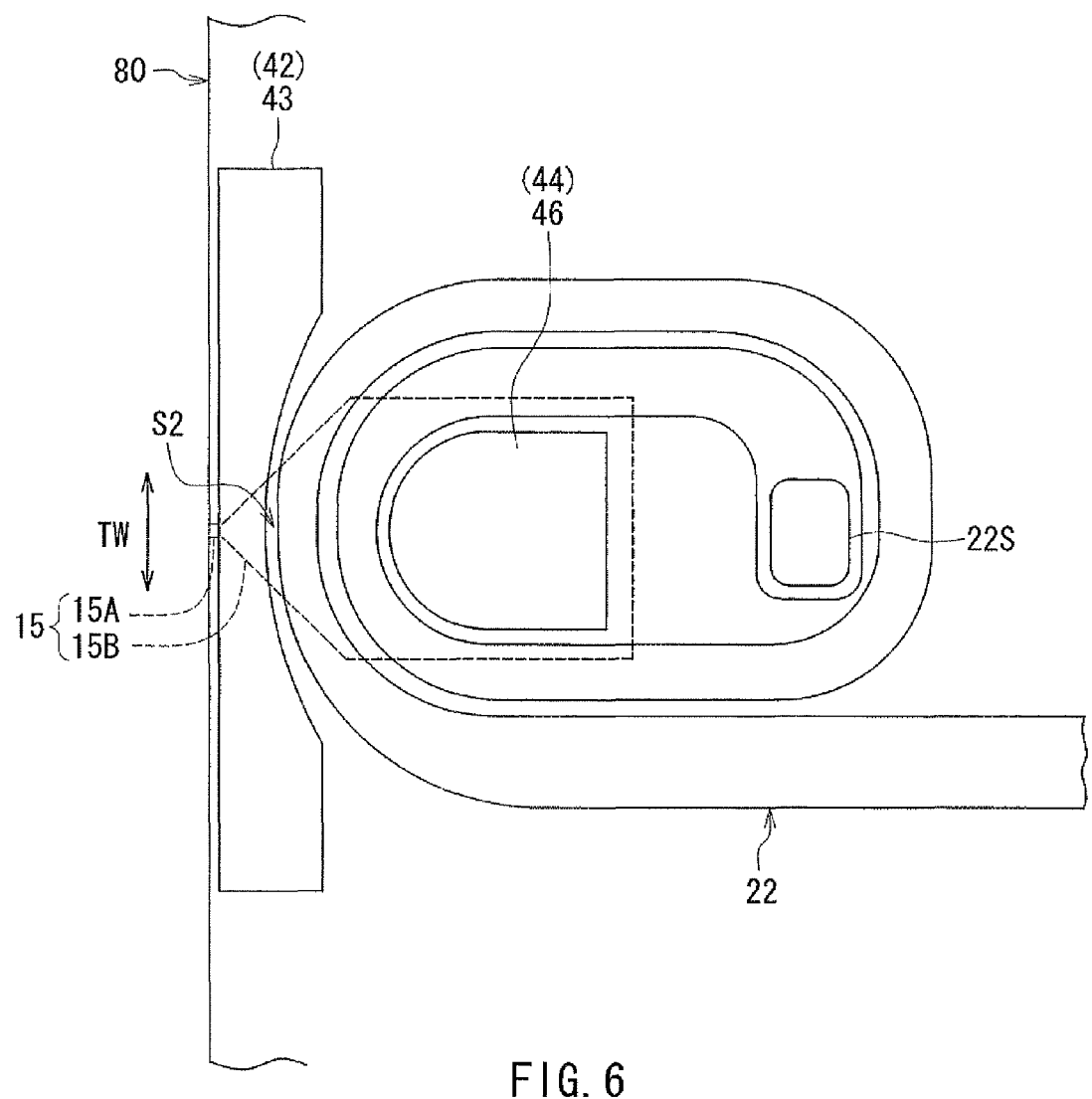
FIG. 6 is a plan view showing a second layer of the second portion of the coil of the magnetic head according to the embodiment of the invention.

An embodiment of the present invention will now be described in detail with reference to the drawings. First, reference is made to FIG. 1 to FIG. 6 to describe the configuration of a magnetic head according to the embodiment of the invention. FIG. 1 is a cross-sectional view showing a write shield and a portion of a main pole in the vicinity of the medium facing surface in the magnetic head according to the embodiment. FIG. 2 is a cross-sectional view of the magnetic head according to the embodiment. The arrow with the symbol T in each of FIG. 1 and FIG. 2 indicates the direction of travel of a recording medium. FIG. 3 is a front view showing the medium facing surface of the magnetic head according to the embodiment. FIG. 4 is a plan view showing a first portion of a coil of the magnetic head according to the embodiment. FIG. 5 is a plan view showing a first layer of a second portion of the coil of the magnetic head according to the embodiment. FIG. 6 is a plan view showing a second layer of the second portion of the coil of the magnetic head according to the embodiment. The arrow with the symbol TW in each of FIG. 3 to FIG. 6 indicates the track width direction.

As shown in FIG. 2 and FIG. 3, the magnetic head for perpendicular magnetic recording (hereinafter simply referred to as the magnetic head) according to the embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces a recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; a nonmagnetic layer 73 made of a nonmagnetic material and disposed on the middle shield layer 72; and a write head section 9 disposed on the nonmagnetic layer 73. The middle shield layer 72 has the function of shielding the MR element 5 from magnetic fields generated in the write head section 9. The nonmagnetic layers 71 and 73 are made of alumina, for example. The write head section 9 includes a coil, a main pole 15, a write shield 16, and a gap part 17.

The coil produces a magnetic field corresponding to data to be written on a recording medium. The coil includes a first portion 10 and a second portion 20. The first portion 10 and the second portion 20 are both made of a conductive material such as copper. The first portion 10 and the second portion 20 are connected in series or in parallel. The main pole 15 has an end face located in the medium facing surface 80. The main pole 15 allows a magnetic flux corresponding to the magnetic field produced by the coil to pass, and produces a write magnetic field for writing data on a recording medium by means of a perpendicular magnetic recording system. FIG. 1 and FIG. 2 each show a cross section that intersects the end face of the main pole 15 located in the medium facing surface 80 and that is perpendicular to the medium facing surface 80 and to the top surface 1a of the substrate 1 (this cross section will hereinafter be referred to as the main cross section).

The write shield 16 has an end face that is located in the medium facing surface 80 to wrap around the end face of the main pole 15. The write shield 16 is made of a magnetic material. The material employed for the write shield 16 may be CoFeN, CoNiFe, NiFe, or CoFe, for example.

The write shield 16 includes a top shield 16A, a bottom shield 16B, a first side shield 16C, and a second side shield 16D that are magnetically coupled to each other. The side shields 16C and 16D are located on opposite sides of the main pole 15 in the track width direction TW. The top shield 16A is located on the front side in the direction T of travel of the recording medium relative to the side shields 16C and 16D, and is in contact with the side shields 16C and 16D. The bottom shield 16B is located on the rear side in the direction T of travel of the recording medium relative to the side shields 16C and 16D, and is in contact with the side shields 16C and 16D.

As shown in FIG. 1 and FIG. 3, the top shield 16A has an end face 16Aa, a bottom surface 16Ab, a top surface 16Ac, and a connecting surface 16Ad. The end face 16Aa is located in the medium facing surface 80 at a position on the front side in the direction T of travel of the recording medium relative to the end face of the main pole 15. The connecting surface 16Ad connects the end face 16Aa and the top surface 16Ac to each other. The distance from the medium facing surface 80 to an arbitrary point on the connecting surface 16Ad increases with increasing distance from the arbitrary point to the top surface 1a of the substrate 1. The bottom shield 16B has an end face 16Ba that is located in the medium facing surface 80 at a position on the rear side in the direction T of travel of the recording medium relative to the end face of the main pole 15. As shown in FIG. 3, the side shields 16C and 16D have two end faces 16Ca and 16Da located in the medium facing surface 80 at positions on opposite sides of the end face of the main pole 15 in the track width direction TW.

The write head section 9 further includes a first return path section 30 and a second return path section 40. The first and second return path sections 30 and 40 are each made of a magnetic material. The material employed for each of the first and second return path sections 30 and 40 may be CoFeN, CoNiFe, NiFe, or CoFe, for example. The first return path section 30 and the second return path section 40 align along a direction perpendicular to the top surface 1a of the substrate 1 with the main pole 15 interposed therebetween. The first return path section 30 is located on the rear side in the direction T of travel of the recording medium relative to the main pole 15, and connects the write shield 16 and part of the main pole 15 away from the medium facing surface 80 to each other, thereby magnetically coupling the write shield 16 and the main pole 15 to each other. The second return path section 40 is located on the front side in the direction T of travel of the recording medium relative to the main pole 15, and connects the write shield 16 and part of the main pole 15 away from the medium facing surface 80 to each other, thereby magnetically coupling the write shield 16 and the main pole 15 to each other.

The first return path section 30 includes a yoke layer 31, a first coupling portion 32, and a second coupling portion 34. The first coupling portion 32 is composed of a single magnetic layer 33. The second coupling portion 34 includes magnetic layers 35 and 36. The yoke layer 31 is located on the nonmagnetic layer 73. The magnetic layers 33 and 35 are both located on the yoke layer 31. The magnetic layer 33 is located near the medium facing surface 80. The magnetic layer 35 is located farther from the medium facing surface 80 than is the magnetic layer 33. The yoke layer 31 and the magnetic layer 33 have their respective end faces that face toward the medium facing surface 80, the end faces being located at a distance from the medium facing surface 80. As shown in FIG. 4, the first portion 10 of the coil is wound approximately three turns around the magnetic layer 35.

The magnetic head further includes: an insulating layer 51 made of an insulating material, disposed on the nonmagnetic layer 73 and surrounding the yoke layer 31; an insulating film 52 made of an insulating material and interposed between the first portion 10 and each of the yoke layer 31 and the magnetic layers 33 and 35; an insulating layer 53 made of an insulating material and disposed in the space between adjacent turns of the first portion 10; and an insulating layer 54 made of an insulating material and disposed around the first portion 10 and the magnetic layer 33. The top surfaces of the first portion 10, the magnetic layers 33 and 35, the insulating film 52, and the insulating layers 53 and 54 are even with each other. The insulating layers 51 and 54 and the insulating film 52 are made of alumina, for example. The insulating layer 53 is made of photoresist, for example.

The bottom shield 16B is disposed over the magnetic layer 33 and the insulating layer 54. The magnetic layer 36 lies on the magnetic layer 35. The magnetic head further includes an insulating layer 55 made of an insulating material and disposed over the top surfaces of the first portion 10, the insulating film 52 and the insulating layers 53 and 54, and a nonmagnetic layer 56 made of a nonmagnetic material, disposed on the insulating layer 55 and surrounding the bottom shield 16B and the magnetic layer 36. The insulating layer 55 and the nonmagnetic layer 56 are made of alumina, for example. The shape of the bottom shield 16B will be described in detail later.

The main pole 15 has a top surface 15T (see FIG. 1), which is a surface located at an end on the front side in the direction T of travel of the recording medium, and a bottom end 15L (see FIG. 1) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the top shield 16A. The portion of the second gap layer 18 constituting the other portion of the gap part 17 is located between the main pole 15 and each of the bottom shield 16B and the side shields 16C and 16D.

The side shields 16C and 16D are disposed on the bottom shield 16B and in contact with the top surface of the bottom shield 16B. The second gap layer 18 is arranged to extend along the sidewalls of the side shields 16C and 16D, the top surface of the bottom shield 16B, and the top surface of the nonmagnetic layer 56. The nonmagnetic material employed to form the second gap layer 18 may be an insulating material or a nonmagnetic metal material. Alumina is an example of an insulating material that can be used to form the second gap layer 18. Ru is an example of a nonmagnetic metal material that can be used to form the second gap layer 18.

The main pole 15 is disposed over the bottom shield 16B and the nonmagnetic layer 56 such that the second gap layer 18 is interposed between the main pole 15 and each of the top surfaces of the bottom shield 16B and the nonmagnetic layer 56. As shown in FIG. 3, the second gap layer 18 is interposed also between the main pole 15 and each of the side shields 16C and 16D.

The bottom end 15L of the main pole 15 is in contact with the top surface of the magnetic layer 36 at a position away from the medium facing surface 80. The main pole 15 is made of a magnetic metal material. The material employed for the main pole 15 may be NiFe, CoNiFe, or CoFe, for example. The shape of the main pole 15 will be described in detail later.

The magnetic head further includes a first nonmagnetic layer (not shown) made of a nonmagnetic material and disposed around the main pole 15 and the side shields 16C and 16D. In the embodiment, the first nonmagnetic layer is particularly made of a nonmagnetic insulating material such as alumina.

The magnetic head further includes a nonmagnetic metal layer 58 made of a nonmagnetic metal material and disposed on part of the top surface 15T of the main pole 15 at a position away from the medium facing surface 80, and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The material employed for the first gap layer 19 may be a nonmagnetic insulating material such as alumina or a nonmagnetic conductive material such as Ru, NiCu, Ta, W, NiB, or NiP.

The top shield 16A is disposed over the side shields 16C and 16D and the first gap layer 19, and is in contact with the top surfaces of the side shields 16C and 16D and the first gap layer 19. In the medium facing surface 80, part of the end face 16Aa of the top shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The second return path section 40 includes a yoke layer 41, a first coupling portion 42, and a second coupling portion 44. The first coupling portion 42 is composed of a single magnetic layer 43. The second coupling portion 44 includes magnetic layers 45 and 46. The magnetic layer 45 lies on the main pole 15 at a position away from the medium facing surface 80.

The second portion 20 of the coil includes a first layer 21 and a second layer 22. As shown in FIG. 5, the first layer 21 is wound one turn around the magnetic layer 45. The magnetic head further includes an insulating film 61 made of an insulating material and interposed between the first layer 21 and each of the top shield 16A, the first gap layer 19 and the magnetic layer 45, and a second nonmagnetic layer (not shown) made of a nonmagnetic material and disposed around the first layer 21 and the top shield 16A. The insulating film 61 is made of alumina, for example. The second nonmagnetic layer is made of an inorganic insulating material, for example. The inorganic insulating material may be alumina or silicon oxide, for example. The top surfaces of the top shield 16A, the first layer 21, the magnetic layer 45, the insulating film 61, and the second nonmagnetic layer are even with each other.

The magnetic head further includes an insulating layer 62 made of an insulating material and disposed over the top surfaces of the first layer 21 and the insulating film 61 and part of the top surface of the magnetic layer 45. The insulating layer 62 is made of alumina, for example.

The magnetic layer 43 is disposed on the top shield 16A. The magnetic layer 43 has an end face that faces toward the medium facing surface 80, the end face being located at a distance from the medium facing surface 80. The distance from the medium facing surface 80 to an arbitrary point on the end face of the magnetic layer 43 increases with increasing distance from the arbitrary point to the top surface 1a of the substrate 1.

The magnetic layer 46 lies on the magnetic layer 45. As shown in FIG. 6, the second layer 22 is wound approximately two turns around the magnetic layer 46. The magnetic head further includes an insulating film 63 made of an insulating material and interposed between the second layer 22 and each of the magnetic layers 43 and 46 and the insulating layer 62, an insulating layer 64 made of an insulating material and disposed in the space between adjacent turns of the second layer 22, and an insulating layer (not shown) made of an insulating material and disposed around the second layer 22 and the magnetic layer 43. The top surfaces of the second layer 22, the magnetic layers 43 and 46, the insulating film 63, the insulating layer 64, and the not-shown insulating layer are even with each other. The magnetic head further includes an insulating layer 65 made of an insulating material and disposed over the top surfaces of the second layer 22, the insulating film 63 and the insulating layer 64. The insulating film 63, the insulating layer 65, and the not-shown insulating layer are made of alumina, for example. The insulating layer 64 is made of photoresist, for example.

The yoke layer 41 is disposed over the magnetic layers 43 and 46 and the insulating layer 65, and connects the magnetic layer 43 and the magnetic layer 46 to each other. The yoke layer 41 has an end face that faces toward the medium facing surface 80, the end face being located at a distance from the medium facing surface 80. The distance from the medium facing surface 80 to an arbitrary point on the end face of the yoke layer 41 increases with increasing distance from the arbitrary point to the top surface 1a of the substrate 1.

The magnetic head further includes a protective layer 70 made of a nonmagnetic material and disposed to cover the write head section 9. The protective layer 70 is made of, for example, an inorganic insulating material such as alumina.

As has been described, the magnetic head according to the embodiment includes the medium facing surface 80, the read head section 8, and the write head section 9. The medium facing surface 80 faces a recording medium. The read head section 8 and the write head section 9 are stacked on the substrate 1. The read head section 8 is located on the rear side in the direction T of travel of the recording medium (i.e., located on the leading side) relative to the write head section 9.

The write head section 9 includes the coil including the first and second portions 10 and 20, the main pole 15, the write shield 16, the gap part 17, and the first and second return path sections 30 and 40. The coil, the main pole 15, the write shield 16, the gap part 17, the first return path section 30, and the second return path section 40 are located above the top surface 1a of the substrate 1. The write shield 16 includes the top shield 16A, the bottom shield 16B, the first side shield 16C, and the second side shield 16D. The gap part 17 is composed of part of the first gap layer 19 and part of the second gap layer 18. The first return path section 30 and the second return path section 40 align along the direction perpendicular to the top surface 1a of the substrate 1 with the main pole 15 interposed therebetween.

The first return path section 30 includes the yoke layer 31 and the first and second coupling portions 32 and 34. The first return path section 30 is located on the rear side in the direction T of travel of the recording medium relative to the main pole 15 and interposed between the main pole 15 and the top surface 1a of the substrate 1. As shown in FIG. 2, the first return path section 30 connects the bottom shield 16B and part of the main pole 15 away from the medium facing surface 80 to each other so that a first space S1 is defined by the main pole 15, the gap part 17 (the gap layer 18), the bottom shield 16B, and the first return path section 30. The first portion 10 of the coil passes through the first space S1. The first coupling portion 32 includes the magnetic layer 33. The second coupling portion 34 includes the magnetic layers 35 and 36.

The yoke layer 31 is located closer to the top surface 1a of the substrate 1 than is the first space S1. The first coupling portion 32 (the magnetic layer 33) has an end face facing toward the medium facing surface 80 and located at a distance from the medium facing surface 80. Part of the insulating layer 54 is interposed between the medium facing surface 80 and the aforementioned end face of the first coupling portion 32 (the magnetic layer 33). The first coupling portion 32 (the magnetic layer 33) is interposed between the first space S1 and the medium facing surface 80 without being exposed in the medium facing surface 80, and magnetically couples the bottom shield 16B and the yoke layer 31 to each other. The second coupling portion 34 (the magnetic layers 35 and 36) is located farther from the medium facing surface 80 than is the first space S1, and magnetically couples the main pole 15 and the yoke layer 31 to each other.

The second return path section 40 includes the yoke layer 41 and the first and second coupling portions 42 and 44, and is located on the front side in the direction T of travel of the recording medium relative to the main pole 15. The second return path section 40 connects the top shield 16A and part of the main pole 15 away from the medium facing surface 80 to each other so that a second space S2 is defined by the main pole 15, the gap part 17 (the gap layer 19), the top shield 16A, and the second return path section 40. The second portion 20 of the coil passes through the second space S2. The first coupling portion 42 includes the magnetic layer 43. The second coupling portion 44 includes the magnetic layers 45 and 46.

The yoke layer 41 is located farther from the top surface 1a of the substrate 1 than is the second space S2. The first coupling portion 42 (the magnetic layer 43) is interposed between the second space S2 and the medium facing surface 80 and magnetically couples the top shield 16A and the yoke layer 41 to each other. The second coupling portion 44 (the magnetic layers 45 and 46) is located farther from the medium facing surface 80 than is the second space S2 and magnetically couples the main pole 15 and the yoke layer 41 to each other.

The first and second portions 10 and 20 of the coil will now be described in detail with reference to FIG. 4 to FIG. 6. FIG. 4 is a plan view showing the first portion 10. The first portion 10 is wound approximately three turns around the magnetic layer 35 which constitutes part of the first return path section 30. The first portion 10 includes a portion that passes between the magnetic layer 33 and the magnetic layer 35, in particular, within the first space S1. The first portion 10 has a coil connection part 10E electrically connected to the second portion 20.

FIG. 5 is a plan view showing the first layer 21 of the second portion 20. The first layer 21 is wound one turn around the magnetic layer 45 which constitutes part of the second return path section 40. The first layer 21 includes a portion that passes between the top shield 16A and the magnetic layer 45, in particular, within the second space S2. The first layer 21 has a coil connection part 21S electrically connected to the coil connection part 10E of the first portion 10, and a coil connection part 21E electrically connected to the second layer 22. The coil connection part 21S is electrically connected to the coil connection part 10E via first and second connection layers of columnar shape (not shown) that penetrate a plurality of layers interposed between the first layer 21 and the first portion 10. The first and second connection layers are stacked in this order on the coil connection part 10E. The coil connection part 21S is disposed on the second connection layer. The first and second connection layers are made of a conductive material such as copper.

FIG. 6 is a plan view showing the second layer 22 of the second portion 20. The second layer 22 is wound approximately two turns around the magnetic layer 46 which constitutes part of the second return path section 40. The second layer 22 includes a portion that passes between the magnetic layer 43 and the magnetic layer 46, in particular, within the second space S2. The second layer 22 has a coil connection part 22S penetrating the insulating layer 62 and the insulating film 63 and electrically connected to the coil connection part 21E of the first layer 21. In the example shown in FIG. 4 to FIG. 6, the first portion 10 and the second portion 20 are connected in series.

The shape of the main pole 15 will now be described in detail with reference to FIG. 1 and FIG. 3 to FIG. 6. As shown in FIG. 4 to FIG. 6, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 1 and FIG. 3, the main pole 15 has the top surface 15T located at the end on the front side in the direction T of travel of the recording medium, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 µm, for example. A zero neck height means that no track width defining portion 15A exists and an end face of the wide portion 15B is thus located in the medium facing surface 80.

The top surface 15T of the main pole 15 includes an inclined portion 15T1 and a flat portion 15T2 arranged in this order, the inclined portion 15T1 being closer to the medium facing surface 80. The inclined portion 15T1 has a front end located in the medium facing surface 80 and a rear end opposite thereto. The flat portion 15T2 is connected to the rear end of the inclined portion 15T1. The inclined portion 15T1 is inclined such that its rear end is located on the front side in the direction T of travel of the recording medium relative to its front end. The flat portion 15T2 extends substantially perpendicularly to the medium facing surface 80.

The bottom end 15L of the main pole 15 includes a first inclined portion 15L1, a first flat portion 15L2, a second inclined portion 15L3, and a second flat portion 15L4 arranged in this order, the first inclined portion 15L1 being closest to the medium facing surface 80. The first inclined portion 15L1 has a front end located in the medium facing surface 80 and a rear end opposite thereto. The first flat portion 15L2 is connected to the rear end of the first inclined portion 15L1. The second inclined portion 5L3 has a front end connected to the first flat portion 15L2 and a rear end that is located farther from the medium facing surface 80 than is the front end. Each of the first inclined portion 15L1, the first flat portion 15L2 and the second inclined portion 15L3 may be an edge formed by two intersecting planes, or may be a plane connecting two planes to each other. The second flat portion 15L4 is a plane connected to the rear end of the second inclined portion 15L3. The first and second inclined portions 15L1 and 15L3 are inclined such that their respective rear ends are located on the rear side in the direction T of travel of the recording medium relative to their respective front ends. The first and second flat portions 15L2 and 15L4 extend substantially perpendicularly to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on a recording medium depends on the position of the first side. The end face of the main pole 15 located in the medium facing surface 80 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 µm, for example.

Reference is now made to FIG. 1 to describe the shape of the bottom shield 16B of the write shield 16 in detail. As shown in FIG. 1, the bottom shield 16B includes a base part 16B1 and a protruding part 16B2. The protruding part 16B2 protrudes from the base part 16B1 toward the main pole 15. In FIG. 1, the boundary between the base part 16B1 and the protruding part 16B2 is shown by a dotted line. The base part 16B1 is in contact with the top surface of the first coupling portion 32 (the magnetic layer 33) and magnetically connected to the first coupling portion 32 (the magnetic layer 33). In the main cross section, the base part 16B1 is greater than the protruding part 16B2 in length in the direction perpendicular to the medium facing surface 80.

The base part 16B1 has: a front end face 16Ba1 constituting a part of the end face 16Ba of the bottom shield 16B; and a top surface 16Bb facing toward the main pole 15. The protruding part 16B2 has: a front end face 16Ba2 constituting another part of the end face 16Ba of the bottom shield 16B; a rear end face 16Bc located opposite to the medium facing surface 80; and an inclined surface 16Bd. The top surface 16Bb of the base part 16B1 is located farther from the medium facing surface 80 than is the rear end face 16Bc of the protruding part 16B2, and is contiguous with the rear end face 16Bc. The inclined surface 16Bd is located closer to the medium facing surface 80 than is the rear end face 16Bc, and is contiguous with the rear end face 16Bc. In the embodiment, the inclined surface 16Bd connects the front end face 16Ba2 and the rear end face 16Bc to each other, in particular.

Here, the angle that the top surface 16Bb of the base part 16B1 forms relative to the direction perpendicular to the medium facing surface 80 will be represented by the symbol $\theta 1$, the angle that the rear end face 16Bc of the protruding part 16B2 forms relative to the direction perpendicular to the medium facing surface 80 will be represented by the symbol $\theta 2$, and the angle that the inclined surface 16Bd of the protruding part 16B2 forms relative to the direction perpendicular to the medium facing surface 80 will be represented by the symbol $\theta 3$.

The angle $\theta 2$ is greater than the angle $\theta 1$. FIG. 1 shows an example in which the top surface 16Bb is inclined relative to the direction perpendicular to the medium facing surface 80. However, as will be illustrated later as first and second modification examples, the top surface 16Bb may extend perpendicularly to the medium facing surface 80. In this case, the angle $\theta 1$ is 0°. Further, FIG. 1 shows an example in which the rear end face 16Bc is inclined relative to the medium facing surface 80. However, as will be illustrated later as the second modification example, the rear end face 16Bc may extend parallel to the medium facing surface 80. In this case, angle $\theta 2$ is 90°.

The angle $\theta 3$ is smaller than the angle $\theta 2$. As will be illustrated later as the second modification example, the inclined surface 16Bd may be replaced with a flat surface that extends perpendicularly to the medium facing surface 80 and connects the front end face 16Ba2 and the rear end face 16Bc to each other.

The angle $\theta 1$ is preferably in the range of 0° to 20°. The angle $\theta 2$ is preferably in the range of 50° to 90°, and more preferably in the range of 50° to 65°. The angle $\theta 3$ is preferably in the range of 30° to 45°. Where the angle $\theta 3$ is in this range, the angle $\theta 2$ is preferably in the range of 50° to 65°.

The function and effects of the magnetic head according to the embodiment will now be described. The magnetic head writes data on a recording medium by using the write head section 9 and reads data stored on the recording medium by using the read head section 8. In the write head section 9, the coil including the first and second portions 10 and 20 produces magnetic fields corresponding to data to be written on a recording medium. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on a recording medium by means of the perpendicular magnetic recording system.

The write shield 16 captures a disturbance magnetic field applied to the magnetic head from the outside thereof. This makes it possible to prevent erroneous writing on a recording medium induced by the disturbance magnetic field intensively captured into the main pole 15. The write shield 16 also has the function of capturing a magnetic flux produced from the end face of the main pole 15 and spreading in directions other than the direction perpendicular to the plane of a recording medium, so as to prevent the magnetic flux from reaching the recording medium.

Furthermore, the write shield 16 and the first and second return path sections 30 and 40 have the function of allowing a magnetic flux that has been produced from the end face of the main pole 15 and has magnetized a recording medium to flow back. More specifically, a part of the magnetic flux that has been produced from the end face of the main pole 15 and has magnetized a recording medium flows back to the main pole 15 through the write shield 16 and the first return path section 30. Another part of the magnetic flux that has been produced from the end face of the main pole 15 and has magnetized the recording medium flows back to the main pole 15 through the write shield 16 and the second return path section 40.

The write shield 16 includes the top shield 16A, the bottom shield 16B, the first side shield 16C, and the second side shield 16D. The embodiment thus makes it possible that, in regions on both the front side and the rear side in the direction T of travel of a recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the embodiment makes it possible to prevent adjacent track erasure induced by a skew. The top shield 16A and the bottom shield 16B contribute not only to the prevention of adjacent track erasure induced by a skew but also to an increase in the gradient of the write magnetic field. The side shields 16C and 16D greatly contribute to the prevention of adjacent track erasure, in particular. According to the embodiment, such functions of the write shield 16 serve to increase the recording density.

Furthermore, as shown in FIG. 3, the embodiment is configured so that in the medium facing surface 80, the distance between the first and second side parts of the main pole 15 in the track width direction TW, i.e., the width of the end face of the main pole 15, decreases with increasing proximity to the top surface 1a of the substrate 1. This feature of the embodiment also serves to prevent adjacent track erasure induced by a skew.

The embodiment is also configured so that in the medium facing surface 80, the distance between the first and second sidewalls of the side shields 16C and 16D in the track width direction TW decreases with increasing proximity to the top surface 1a of the substrate 1, as does the distance between the first and second side parts of the main pole 15. The embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the embodiment, there are provided the first return path section 30 which magnetically couples the bottom shield 16B of the write shield 16 and the main pole 15 to each other, and the second return path section 40 which magnetically couples the top shield 16A of the write shield 16 and the main pole 15 to each other. Such a configuration allows the magnetic flux captured by the write shield 16 to flow into the main pole 15 by way of the first and second return path sections 30 and 40. In the embodiment, the first and second return path sections 30 and 40 and the main pole 15, which are magnetic layers large in volume, are magnetically connected to the write shield 16. This allows the write shield 16 to capture much magnetic flux, so that the above-described effect of the write shield 16 can be exerted effectively.

If the first return path section has an end face that is exposed over a large area in the medium facing surface 80, part of the magnetic flux that has been captured from the end face of the write shield 16 into the write shield 16 and has reached the first return path section may leak from the end face of the first return path section toward the recording medium. This may result in the occurrence of adjacent track erasure. Furthermore, heat generated by the first portion 10 of the coil may cause expansion of part of the first return path section and thereby cause the end face of the first return path section which constitutes part of the medium facing surface 80 to protrude toward the recording medium. As a result, the end face of the main pole 15 and an end of the read head section 8 located in the medium facing surface 80 may get farther from the recording medium. This may result in degradation of the read and write characteristics.

In contrast to this, in the embodiment, the first return path section 30 does not have an end face that is exposed over a large area in the medium facing surface 80. More specifically, in the embodiment, the first coupling portion 32 which constitutes part of the first return path section 30 is interposed between the first space S1 and the medium facing surface 80 without being exposed in the medium facing surface 80, and magnetically couples the bottom shield 16B and the yoke layer 31 to each other. Further, in the embodiment, the bottom shield 16B includes the base part 16B1 and the protruding part 16B2. In the main cross section, the base part 16B1 is greater than the protruding part 16B2 in length in the direction perpendicular to the medium facing surface 80. According to the embodiment, it is thus possible to connect the first return path section 30 (the first coupling portion 32) to the bottom shield 16B (the base part 16B1) while avoiding exposure of the first coupling portion 32 in the medium facing surface 80. Consequently, according to the embodiment, it is possible to avoid the above-described problems resulting from the configuration in which the end face of the first return path section is exposed over a large area in the medium facing surface 80. Specifically, the embodiment makes it possible to suppress the leakage of magnetic flux from the first return path section 30 toward the recording medium and suppress the protrusion of part of the medium facing surface 80 in the vicinity of the first coupling portion 32.

In the embodiment, in particular, the insulating layer 54 which is harder than the magnetic layer 33 constituting part of the first coupling portion 32 is provided between the magnetic layer 33 and the medium facing surface 80. The insulating layer 54 exists over a larger area than does the magnetic layer 33. The insulating layer 54 thus functions to prevent changes in the position of the magnetic layer 33 induced by heat generated by the first portion 10. Consequently, according to the embodiment, it is possible to more effectively suppress the protrusion of part of the medium facing surface 80 in the vicinity of the first coupling portion 32.

Now, a case will be contemplated where the bottom shield does not include the base part 16B1 and thus consists only of the protruding part 16B2. In this case, it is necessary to provide a coupling layer for magnetically coupling the bottom shield and the first coupling portion 32 (the magnetic layer 33) to each other. This requires that the coupling layer and the bottom shield be formed by patterning different magnetic layers in different steps, thus requiring a larger number of steps for forming the coupling layer and the bottom shield.

In contrast, according to the embodiment, the feature that the bottom shield 16B includes the base part 16B1 and the protruding part 16B2 eliminates the need for a coupling layer separate from the bottom shield 16B. Further, as will be described in detail later, the base part 16B1 and the protruding part 16B2 can be formed by patterning a single magnetic layer. The bottom shield 16B can thus be formed in a smaller number of steps than the number of steps required for forming a coupling layer and the bottom shield. Consequently, according to the embodiment, it is possible to manufacture the magnetic head in a smaller number of steps.

Further, providing a coupling layer separate from the bottom shield requires that the bottom shield be formed on the coupling layer by, for example, plating. In this case, a seed layer for forming the bottom shield is to exist between the coupling layer and the bottom shield. An end of the seed layer is exposed in the medium facing surface 80. In the vicinity of this end of the seed layer, magnetic field tends to leak from the inside to the outside of a magnetic path including the bottom shield and the coupling layer. This may result in the occurrence of adjacent track erasure. According to the embodiment, since the aforementioned coupling layer is not required, it is possible to prevent the occurrence of adjacent track erasure associated with the seed layer.

Further, in the embodiment, the top surface 15T of the main pole 15 includes the inclined portion 15T1 inclined such that its rear end is located on the front side in the direction T of travel of the recording medium relative to its front end, while the bottom end 15L of the main pole 15 includes the first and second inclined portions 15L1 and 15L3 inclined such that their respective rear ends are located on the rear side in the direction T of travel of the recording medium relative to their respective front ends. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

Further, in the embodiment, the bottom shield 16B is configured so that the base part 16B1 has the top surface 16B1*b* and the protruding part 16B2 has the rear end face 16Bc and the inclined surface 16Bd. The angle θ3 that the inclined surface 16Bd forms relative to the direction perpendicular to the medium facing surface 80 is smaller than the angle θ2 that the rear end face 16Bc forms relative to the direction perpendicular to the medium facing surface 80. If the angle θ2 is smaller than or equal to the angle θ3, the bottom end 15L of the main pole 15 including the first inclined portion 15L1 is opposed to the rear end face 16Bc and the inclined surface 16Bd over a large area with a small spacing therebetween. This leads to a problem that a large amount of magnetic flux leaks from the main pole 15 to the bottom shield 16B and thus causes degradation in write characteristics such as the overwrite property.

In the embodiment, the angle θ3 is smaller than the angle θ2, that is, the angle θ2 is greater than the angle θ3. This allows the distance from the main pole 15 to an arbitrary point on the rear end face 16Bc to increase with decreasing distance from the arbitrary point to the top surface 16Bb of the base part 16B1, in contrast to the case where the angle θ2 is smaller than or equal to the angle θ3. It is thereby possible to prevent magnetic flux leakage from the main pole 15 to the bottom shield 16B. Consequently, according to the embodiment, it is possible to prevent the skew-induced problems and provide improved write characteristics.

A method of manufacturing the magnetic head according to the embodiment will now be described with reference to FIG. 7A through FIG. 17B. FIG. 7A through FIG. 17B each show a stack of layers formed in the process of manufacturing the magnetic head. Note that portions located below the nonmagnetic layer 73 are omitted from FIG. 14A through FIG. 16B. FIG. 7A to FIG. 17A each show the main cross section. FIG. 7B to FIG. 17B each show a cross section taken at the position at which the medium facing surface 80 is to be formed. The symbol "ABS" in each of FIG. 7A to FIG. 17A indicates the position at which the medium facing surface 80 is to be formed.

Figure 7A:
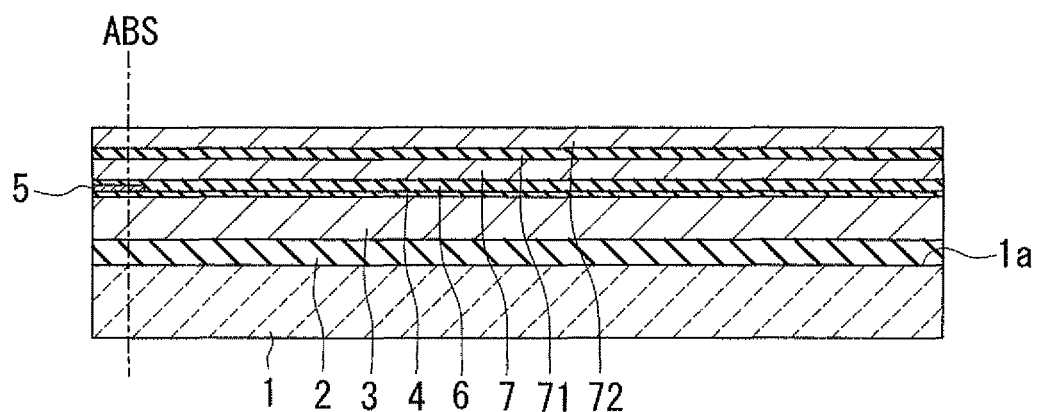
FIG. 7A and FIG. 7B are cross-sectional views showing a step of a method of manufacturing the magnetic head according to the embodiment of the invention.
Figure 7B:
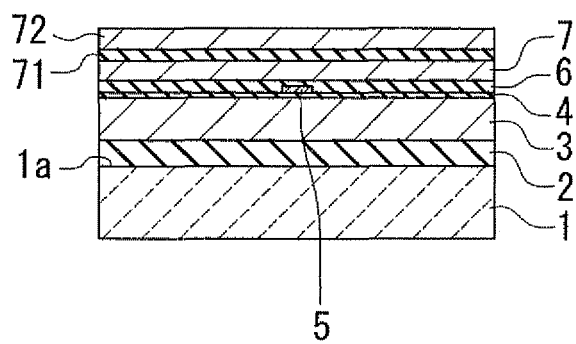

In the method of manufacturing the magnetic head according to the embodiment, first, as shown in FIG. 7A and FIG. 7B, the insulating layer 2, the first read shield layer 3, and the first read shield gap film 4 are formed in this order on the substrate 1. Next, the MR element 5 and leads (not shown) connected to the MR element 5 are formed on the first read shield gap film 4. The MR element 5 and the leads are then covered with the second read shield gap film 6. Then, the second read shield layer 7, the nonmagnetic layer 71, and the middle shield layer 72 are formed in this order on the second read shield gap film 6.

Figure 8A:
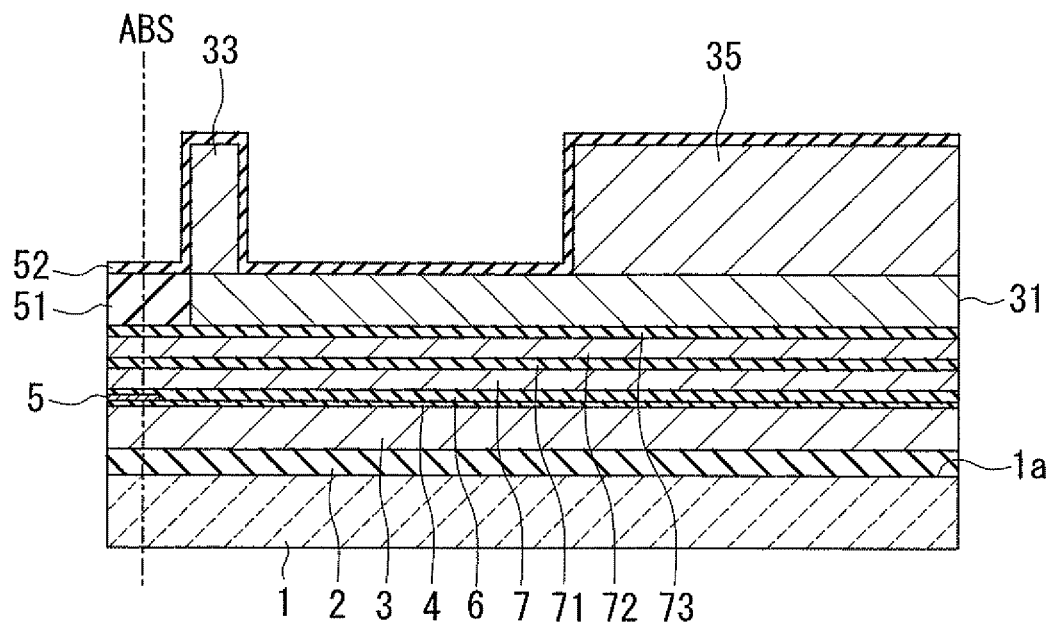
FIG. 8A and FIG. 8B are cross-sectional views showing a step that follows the step shown in FIG. 7A and FIG. 7B.
Figure 8B:
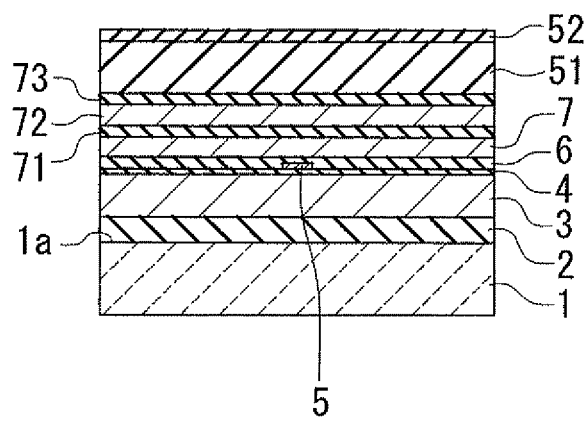

FIG. 8A and FIG. 8B show the next step. In this step, first, the nonmagnetic layer 73 is formed on the middle shield layer 72. The yoke layer 31 is then formed on the nonmagnetic layer 73 by frame plating, for example. Next, the insulating layer 51 is formed over the entire top surface of the stack. The insulating layer 51 is then polished by, for example, chemical mechanical polishing (hereinafter referred to as CMP), until the yoke layer 31 is exposed. The top surfaces of the yoke layer 31 and the insulating layer 51 are thereby made even with each other. Next, the magnetic layers 33 and 35 are formed on the yoke layer 31 by frame plating, for example. The insulating film 52 is then formed over the entire top surface of the stack. Where alumina is selected as the material of the insulating film 52, the insulating film 52 is formed by atomic layer deposition, for example.

Figure 9A:
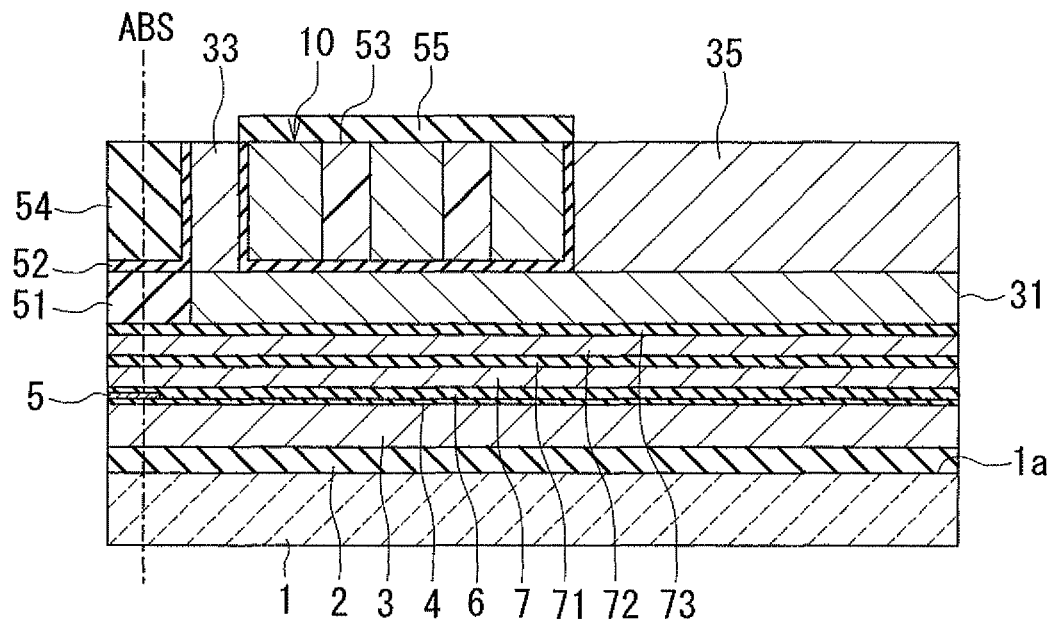
FIG. 9A and FIG. 9B are cross-sectional views showing a step that follows the step shown in FIG. 8A and FIG. 8B.
Figure 9B:
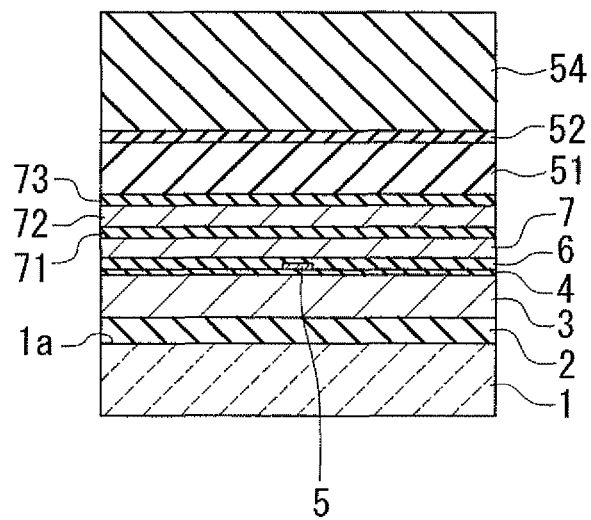

FIG. 9A and FIG. 9B show the next step. In this step, first, the first portion 10 of the coil is formed by frame plating, for example. The insulating layer 53 is then formed in the space between adjacent turns of the first portion 10. The first portion 10 and the insulating layer 53 are formed such that their top surfaces are higher in level than portions of the insulating film 52 that are located on the magnetic layers 33 and 35. Next, the insulating layer 54 is formed over the entire top surface of the stack. The first portion 10, the insulating film 52, and the insulating layers 53 and 54 are then polished by, for example, CMP, until the magnetic layers 33 and 35 are exposed. The top surfaces of the first portion 10, the magnetic layers 33 and 35, the insulating film 52, and the insulating layers 53 and 54 are thereby made even with each other.

Next, the insulating layer 55 is formed over the entire top surface of the stack. The insulating layer 55 is then selectively etched by, for example, ion beam etching (hereinafter referred to as IBE) so that the top surfaces of the magnetic layers 33 and 35, part of the top surface of the insulating layer 54, and the coil connection part 10E (see FIG. 4) of the first portion 10 are exposed.

Figure 10A:
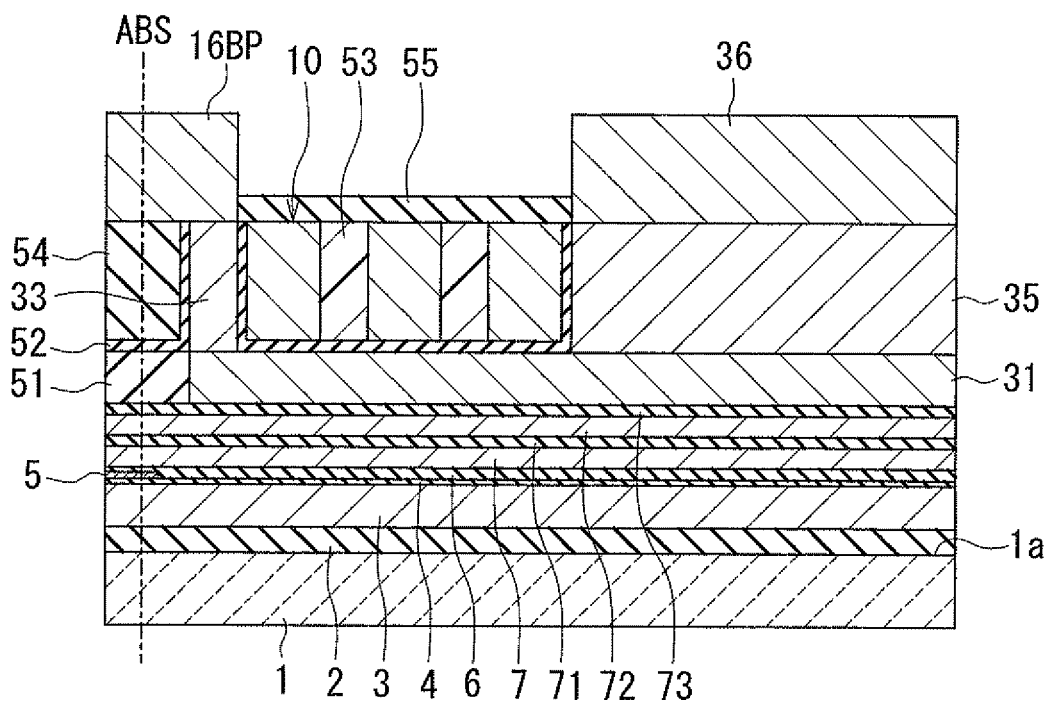
FIG. 10A and FIG. 10B are cross-sectional views showing a step that follows the step shown in FIG. 9A and FIG. 9B.
Figure 10B:
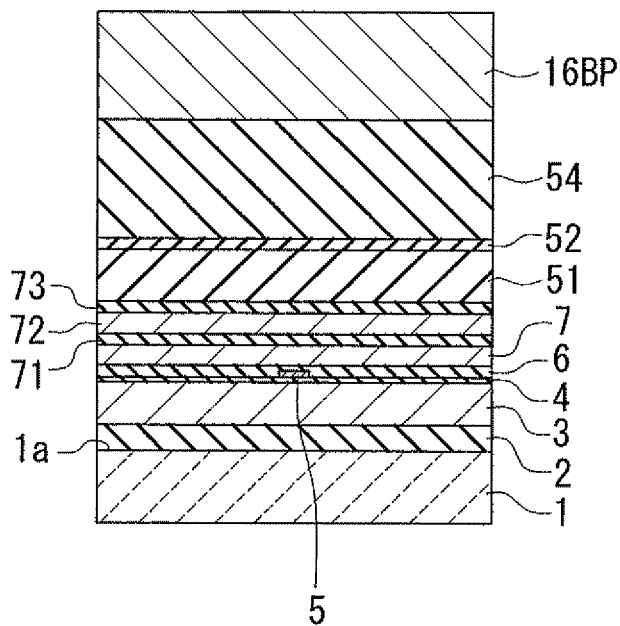

FIG. 10A and FIG. 10B show the next step. In this step, a magnetic layer 16BP, which is to later become the bottom shield 16B, is formed over the magnetic layer 33 and the insulating layer 54, the magnetic layer 36 is formed on the magnetic layer 35, and the first connection layer (not shown) is formed on the coil connection part 10E of the first portion 10, by performing frame plating, for example.

Figure 11A:
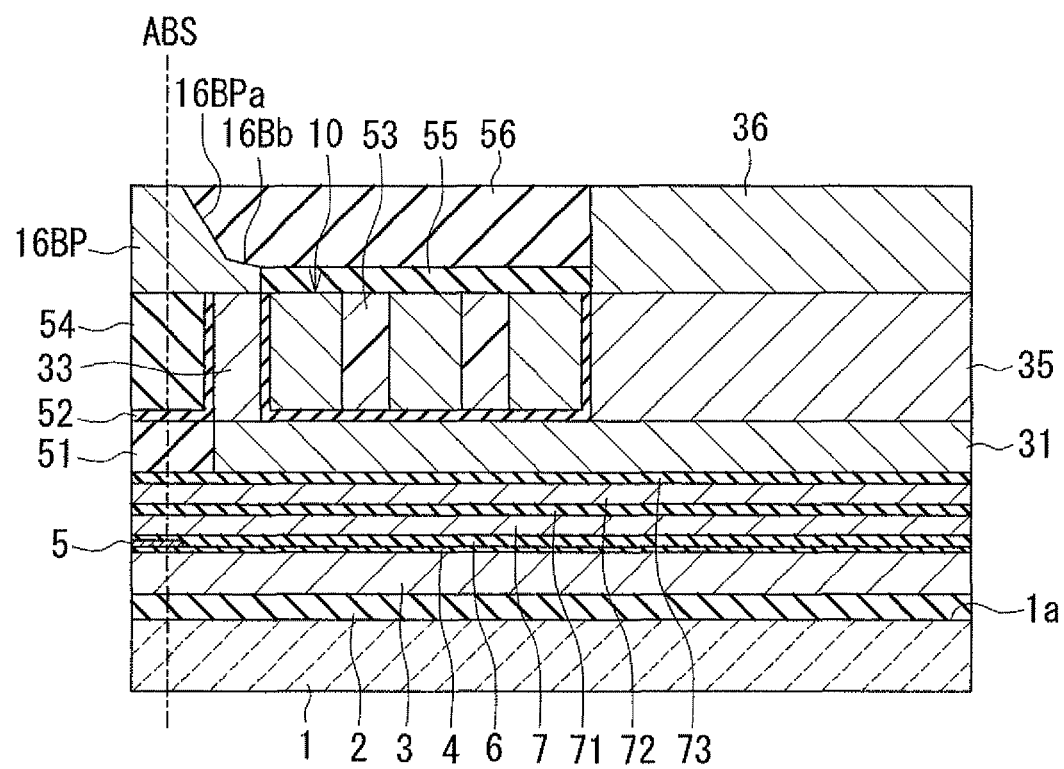
FIG. 11A and FIG. 11B are cross-sectional views showing a step that follows the step shown in FIG. 10A and FIG. 10B.
Figure 11B:
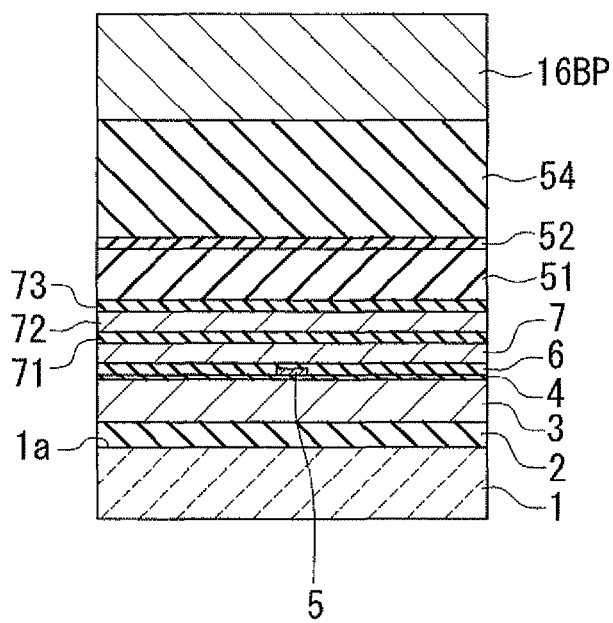

FIG. 11A and FIG. 11B show the next step. In this step, first, part of the magnetic layer 16BP is taper-etched by, for example, IBE, so that the magnetic layer 16BP is provided with the top surface 16Bb of the base part 16B1 and an inclined surface 16BPa including a portion that is to later become the rear end face 16Bc of the protruding part 16B2. Next, the nonmagnetic layer 56 is formed over the entire top surface of the stack. The nonmagnetic layer 56 is then polished by, for example, CMP, until the magnetic layers 16BP and 36 and the first connection layer are exposed. The top surfaces of the magnetic layers 16BP and 36, the first connection layer, and the nonmagnetic layer 56 are thereby made even with each other.

Figure 12A:
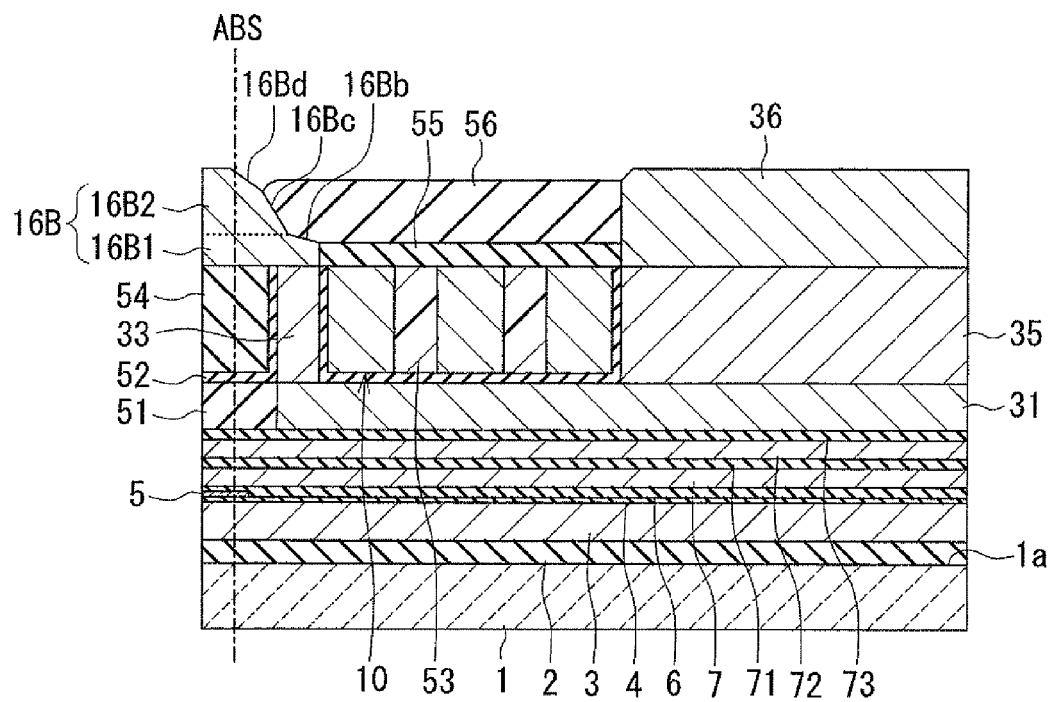
FIG. 12A and FIG. 12B are cross-sectional views showing a step that follows the step shown in FIG. 11A and FIG. 11B.
Figure 12B:
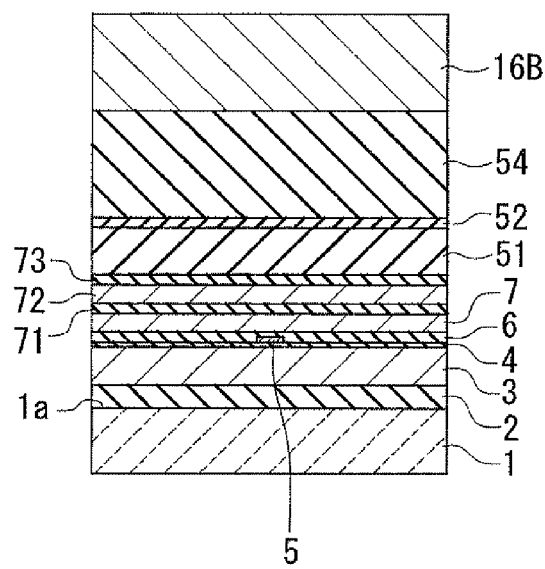

FIG. 12A and FIG. 12B show the next step. In this step, first, part of the nonmagnetic layer 56 is etched by, for example, reactive ion etching (hereinafter referred to as RIE) so as to expose an area of the inclined surface 16BPa of the magnetic layer 16BP where the inclined surface 16Bd of the protruding part 16B2 is to be formed later. Next, part of the inclined surface 16BPa of the magnetic layer 16BP is taper-etched by, for example, IBE, so that the magnetic layer 16BP is provided with the inclined surface 16Bd. The rest of the inclined surface 16BPa remaining unetched makes the rear end face 16Bc of the protruding part 16B2. The magnetic layer 16BP thereby becomes the bottom shield 16B. Next, part of the magnetic layer 36 is etched by, for example, RIE, so as to chamfer corners at the edge of the top surface of the magnetic layer 36.

Figure 13A:
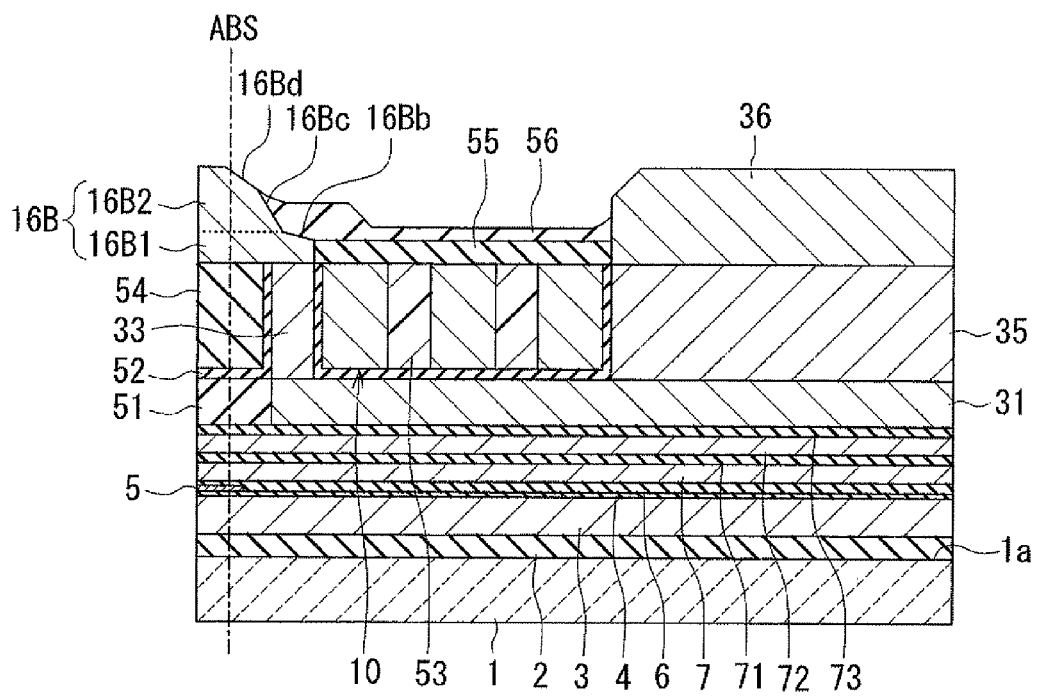
FIG. 13A and FIG. 13B are cross-sectional views showing a step that follows the step shown in FIG. 12A and FIG. 12B.
Figure 13B:
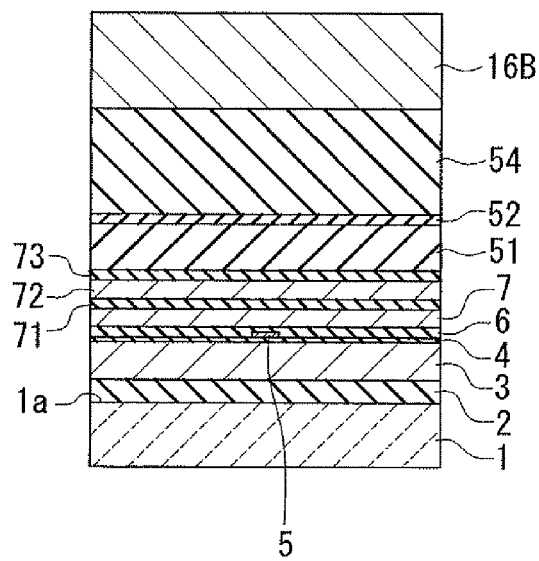

FIG. 13A and FIG. 13B show the next step. In this step, the nonmagnetic layer 56 is taper-etched in part by RIE, for example. This etching is performed to provide the nonmagnetic layer 56 with a first inclined surface contiguous with the inclined surface 16Bd of the protruding part 16B2, and a flat portion, a second inclined surface and a bottom which are arranged in this order of increasing distance from the medium facing surface 80, the flat portion being contiguous with the first inclined surface. The shape of the bottom end 15L of the main pole 15 is thereby determined.

Figure 14A:
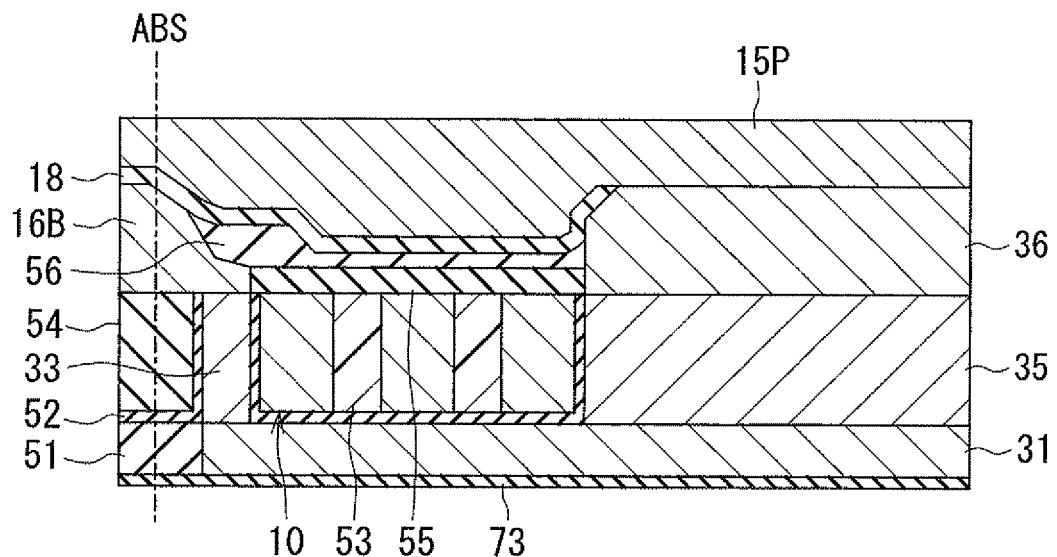
FIG. 14A and FIG. 14B are cross-sectional views showing a step that follows the step shown in FIG. 13A and FIG. 13B.
Figure 14B:
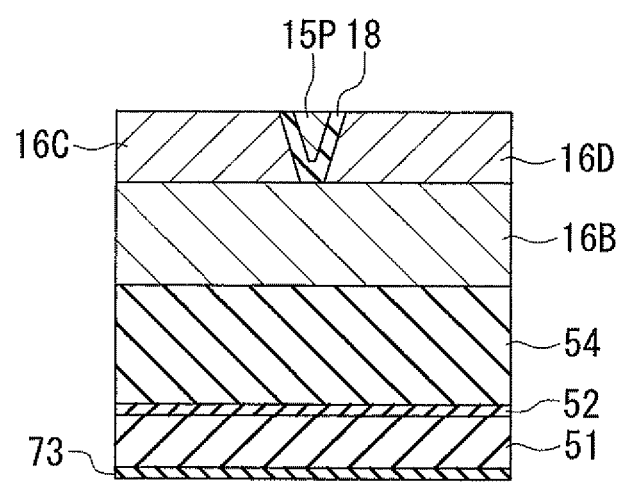

FIG. 14A and FIG. 14B show the next step. In this step, first, the side shields 16C and 16D are formed on the bottom shield 16B by frame plating, for example. The second gap layer 18 is then formed to cover the bottom shield 16B and the side shields 16C and 16D. Where alumina is selected as the material of the second gap layer 18, the second gap layer 18 is formed by atomic layer deposition, for example. Where Ru is selected as the material of the second gap layer 18, the second gap layer 18 is formed by chemical vapor deposition, for example.

Next, the second gap layer 18 is selectively etched to form therein an opening for exposing the top surface of the magnetic layer 36 and an opening for exposing the top surface of the first connection layer (not shown). Next, a magnetic layer 15P, which is to later become the main pole 15, and the second connection layer (not shown) are formed by frame plating, for example. The magnetic layer 15P and the second connection layer are formed such that their top surfaces are higher in level than portions of the second gap layer 18 that are located on the side shields 16C and 16D. Next, the first nonmagnetic layer (not shown) is formed over the entire top surface of the stack. The magnetic layer 15P, the second connection layer, and the first nonmagnetic layer are then polished by, for example, CMP, until the side shields 16C and 16D are exposed.

Figure 15A:
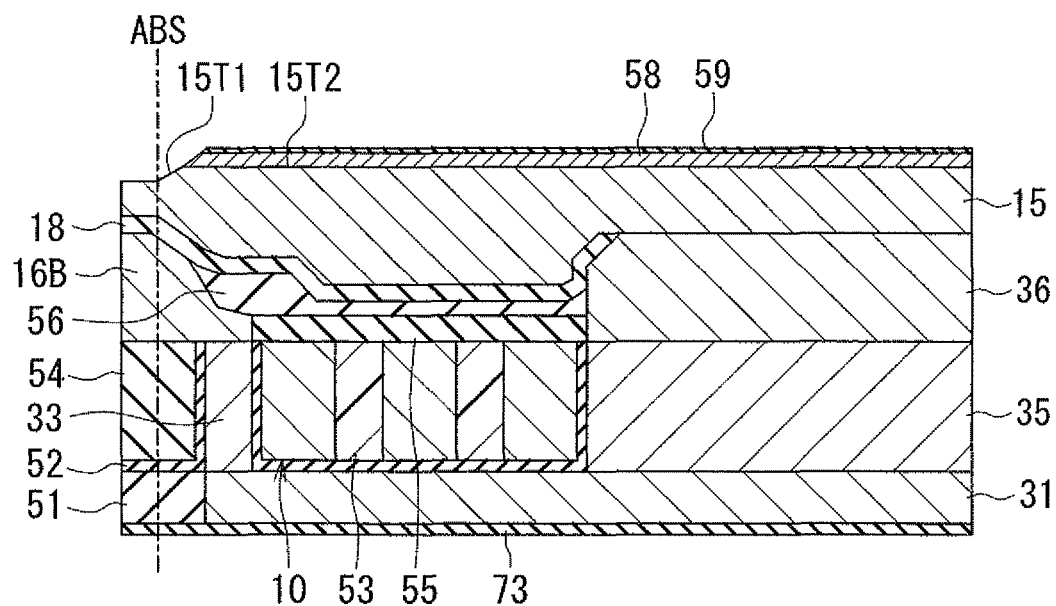
FIG. 15A and FIG. 15B are cross-sectional views showing a step that follows the step shown in FIG. 14A and FIG. 14B.
Figure 15B:
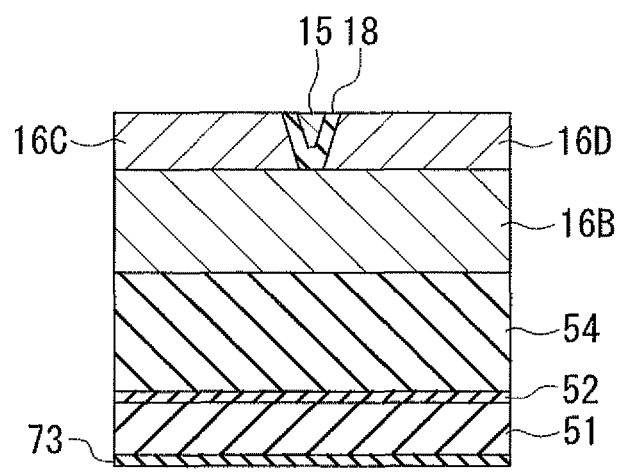

FIG. 15A and FIG. 15B show the next step. In this step, first, the nonmagnetic metal layer 58 and the insulating layer 59 are formed on the magnetic layer 15P. Using the nonmagnetic metal layer 58 and the insulating layer 59 as etching masks, respective portions of the magnetic layer 15P, the side shields 16C and 16D, and the second gap layer 18 are then etched by IBE, for example. This makes the magnetic layer 15P into the main pole 15.

Where IBE is employed to etch the portions of the magnetic layer 15P, the side shields 16C and 16D and the second gap layer 18, the etching is performed such that the direction of travel of the ion beams is at an angle of 40° to 75° relative to the direction perpendicular to the top surface 1a of the substrate 1 and that the direction of travel of the ion beams is caused to rotate as viewed in the direction perpendicular to the top surface 1a of the substrate 1. Performing IBE in such a manner provides the magnetic layer 15P with a top surface having the inclined portion 15T1 and the flat portion 15T2.

Figure 16A:
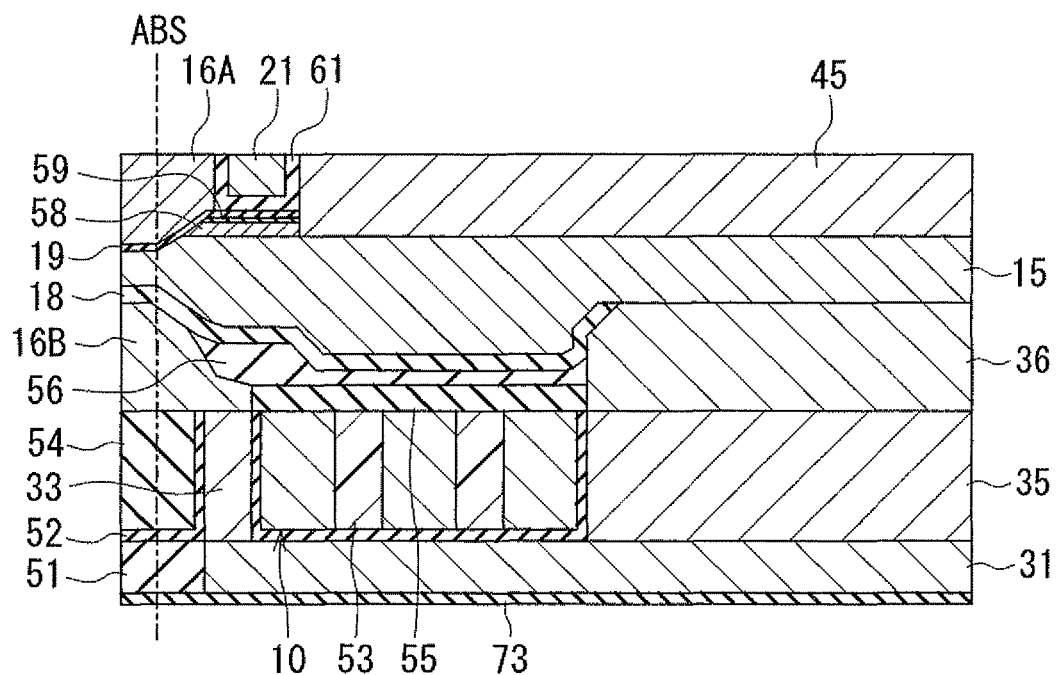
FIG. 16A and FIG. 16B are cross-sectional views showing a step that follows the step shown in FIG. 15A and FIG. 15B.
Figure 16B:
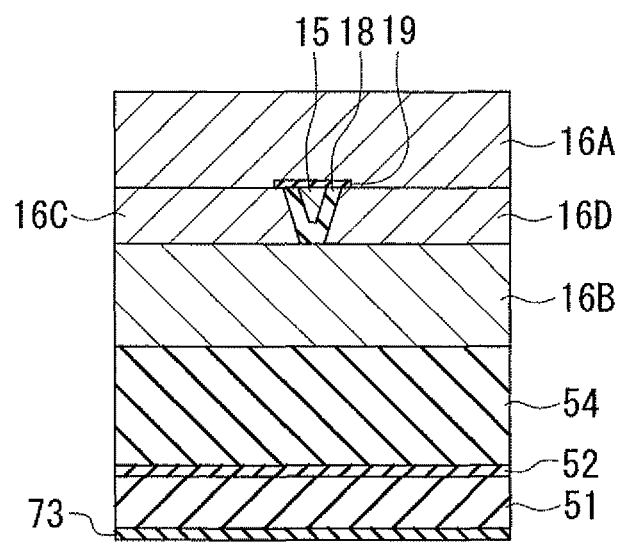

FIG. 16A and FIG. 16B show the next step. In this step, first, the first gap layer 19 is formed over the entire top surface of the stack by sputtering or chemical vapor deposition, for example. The first gap layer 19, the nonmagnetic metal layer 58, and the insulating layer 59 are then selectively etched by, for example, IBE, so that part of the top surface 15T of the main pole 15, part of the top surface of each of the side shields 16C and 16D, and the top surface of the second connection layer are exposed. Next, the top shield 16A is formed over the side shields 16C and 16D and the first gap layer 19, and the magnetic layer 45 is formed on the main pole 15, by performing frame plating, for example. The insulating film 61 is then formed over the entire top surface of the stack. Where alumina is selected as the material of the insulating film 61, the insulating film 61 is formed by atomic layer deposition, for example. Next, the insulating film 61 is selectively etched by, for example, IBE, so that the top surface of the second connection layer is exposed.

Next, the first layer 21 of the second portion 20 of the coil is formed by frame plating, for example. The first layer 21 is formed such that its top surface is higher in level than portions of the insulating film 61 that are located on the top shield 16A and the magnetic layer 45. Next, the second nonmagnetic layer (not shown) is formed over the entire top surface of the stack. The first layer 21, the insulating film 61, and the second nonmagnetic layer are then polished by, for example, CMP, until the top shield 16A and the magnetic layer 45 are exposed. The top surfaces of the top shield 16A, the first layer 21, the magnetic layer 45, the insulating film 61, and the second nonmagnetic layer are thereby made even with each other.

Figure 17A:
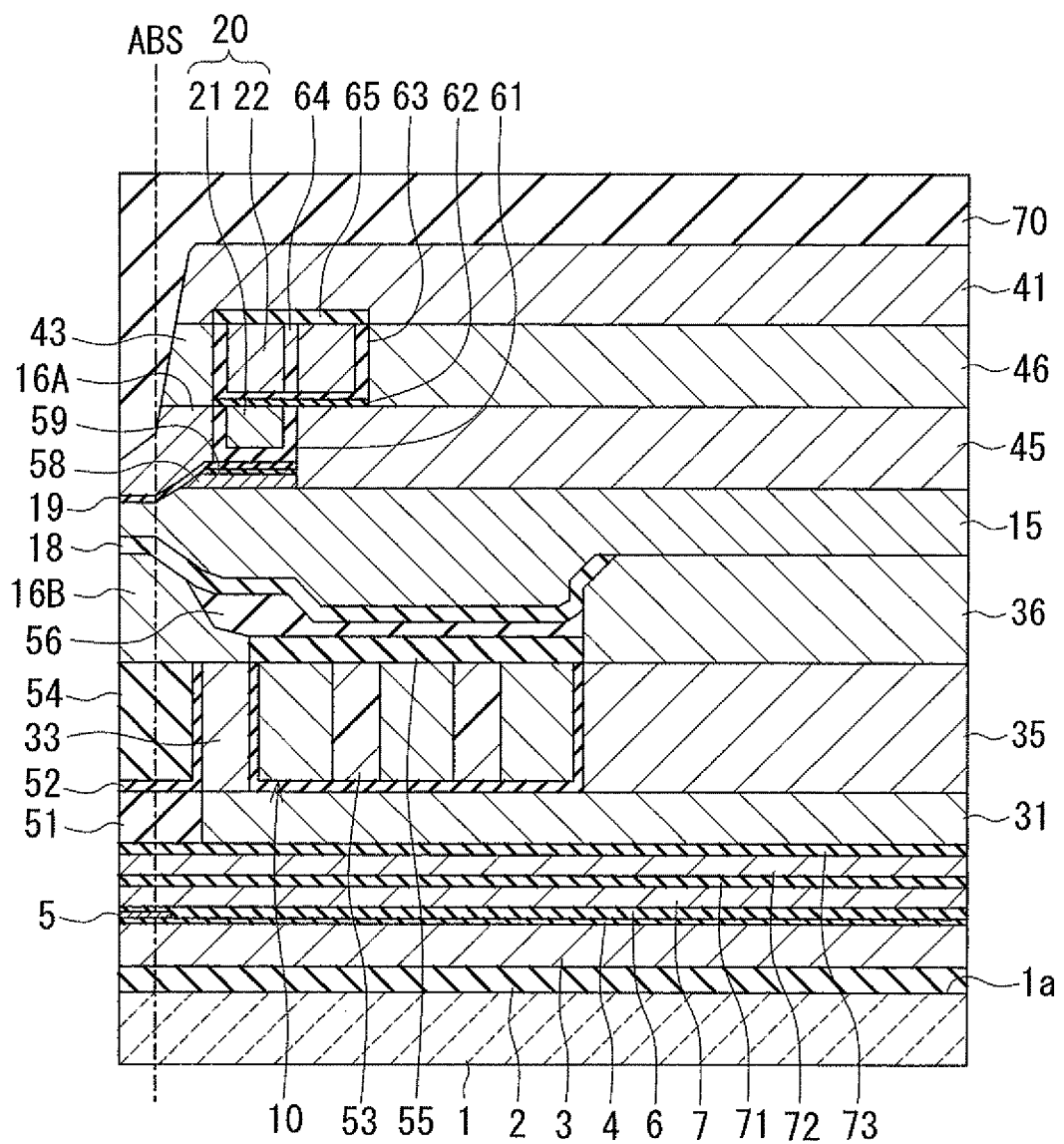
FIG. 17A and FIG. 17B are cross-sectional views showing a step that follows the step shown in FIG. 16A and FIG. 16B.
Figure 17B:
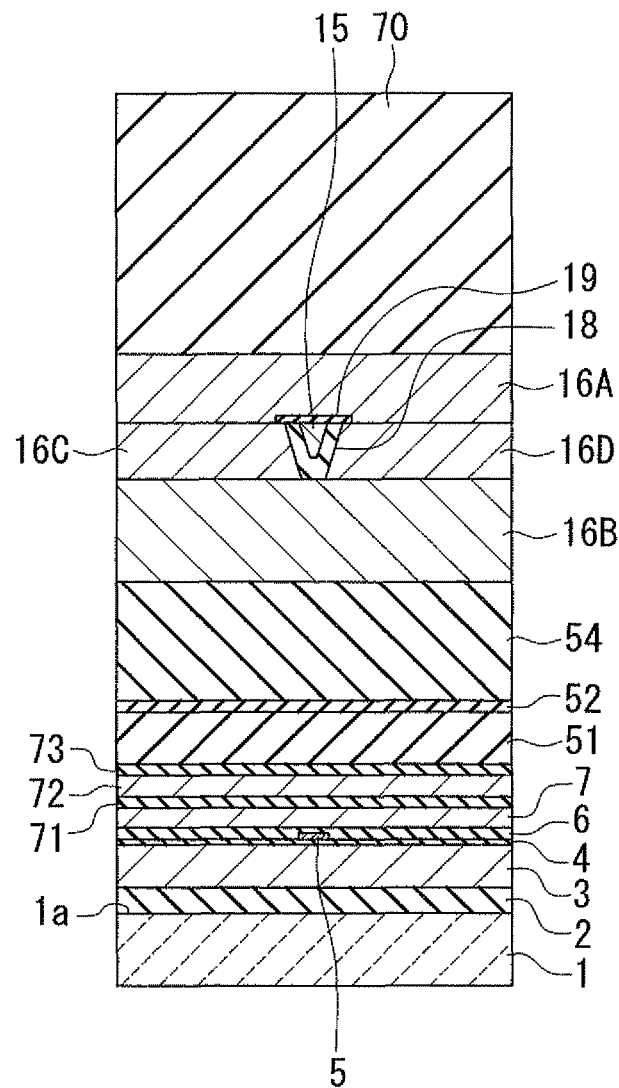

FIG. 17A and FIG. 17B show the next step. In this step, first, the insulating layer 62 is formed over the entire top surface of the stack. The insulating layer 62 is then selectively etched by, for example, IBE, so that the top surface of the top shield 16A and part of the top surface of the magnetic layer 45 are exposed. Then, the magnetic layer 43 is formed on the top shield 16A, and the magnetic layer 46 is formed on the magnetic layer 45, by performing frame plating, for example. The insulating film 63 is then formed over the entire top surface of the stack. Where alumina is selected as the material of the insulating film 63, the insulating film 63 is formed by atomic layer deposition, for example. Next, the insulating layer 62 and the insulating film 63 are selectively etched by, for example, IBE, so that the coil connection part 21E (see FIG. 5) of the first layer 21 is exposed.

Next, the second layer 22 of the second portion 20 of the coil and the insulating layer 64 are formed. The second layer 22 and the insulating layer 64 are formed in the same manner as the first portion 10 of the coil and the insulating layer 53. Next, an insulating layer (not shown) is formed over the entire top surface of the stack. The second layer 22, the insulating film 63, the insulating layer 64, and the not-shown insulating layer are then polished by, for example, CMP, until the magnetic layers 43 and 46 are exposed. The top surfaces of the magnetic layers 43 and 46, the second layer 22, the insulating film 63, the insulating layer 64, and the not-shown insulating layer are thereby made even with each other. Next, the insulating layer 65 is formed over the top surfaces of the second layer 22, the insulating film 63, and the insulating layer 64. The yoke layer 41 is then formed over the magnetic layers 43 and 46 and the insulating layer 65 by frame plating, for example.

Next, a photoresist mask (not shown) is formed on the top surface of the stack. The photoresist mask is formed by patterning a photoresist layer. The photoresist mask is not present in the position ABS at which the medium facing surface 80 is to be formed, but is present on a portion of the stack that is to remain as the magnetic head (the portion located on the right side relative to the position ABS in FIG. 17A) and covers part of the yoke layer 41. Using this photoresist mask as an etching mask, respective portions of the top shield 16A, the yoke layer 41, and the magnetic layer 43 are then etched by IBE, for example. The photoresist mask is then removed.

Next, the protective layer 70 is formed to cover the entire top surface of the stack. Wiring, terminals and other components are then formed on the protective layer 70, and the substrate 1 is cut near the position at which the medium facing surface 80 is to be formed. The cut surface is polished into the medium facing surface 80, and then fabrication of flying rails and other processes are performed to complete the magnetic head.

As has been described, the method of manufacturing the magnetic head according to the embodiment includes the steps of forming the first return path section 30 (the magnetic layers 33, 35, and 36), forming the second return path section 40 (the magnetic layers 43, 45, and 46), forming the first and second portions 10 and 20 of the coil, forming the main pole 15, forming the write shield 16, and forming the gap part 17. The step of forming the write shield 16 includes the steps of forming the top shield 16A, forming the bottom shield 16B, and forming the side shields 16C and 16D.

The step of forming the bottom shield 16B includes the step of forming the magnetic layer 16BP and the step of etching the magnetic layer 16BP so as to provide the magnetic layer 16BP with the top surface 16Bb of the base part 16B1 and the rear end face 16Bc and the inclined surface 16Bd of the protruding part 16B2 so that the magnetic layer 16BP becomes the bottom shield 16B. According to the embodiment, it is thus possible to form the bottom shield 16B into the shape described previously.

As previously described, the embodiment eliminates the need for a coupling layer separate from the bottom shield 16B and thus allows the magnetic head to be manufactured in a smaller number of steps. Furthermore, according to the embodiment, it is possible to prevent the occurrence of adjacent track erasure attributable to the presence of a seed layer between a coupling layer and the bottom shield.

Modification Examples

Figure 18:
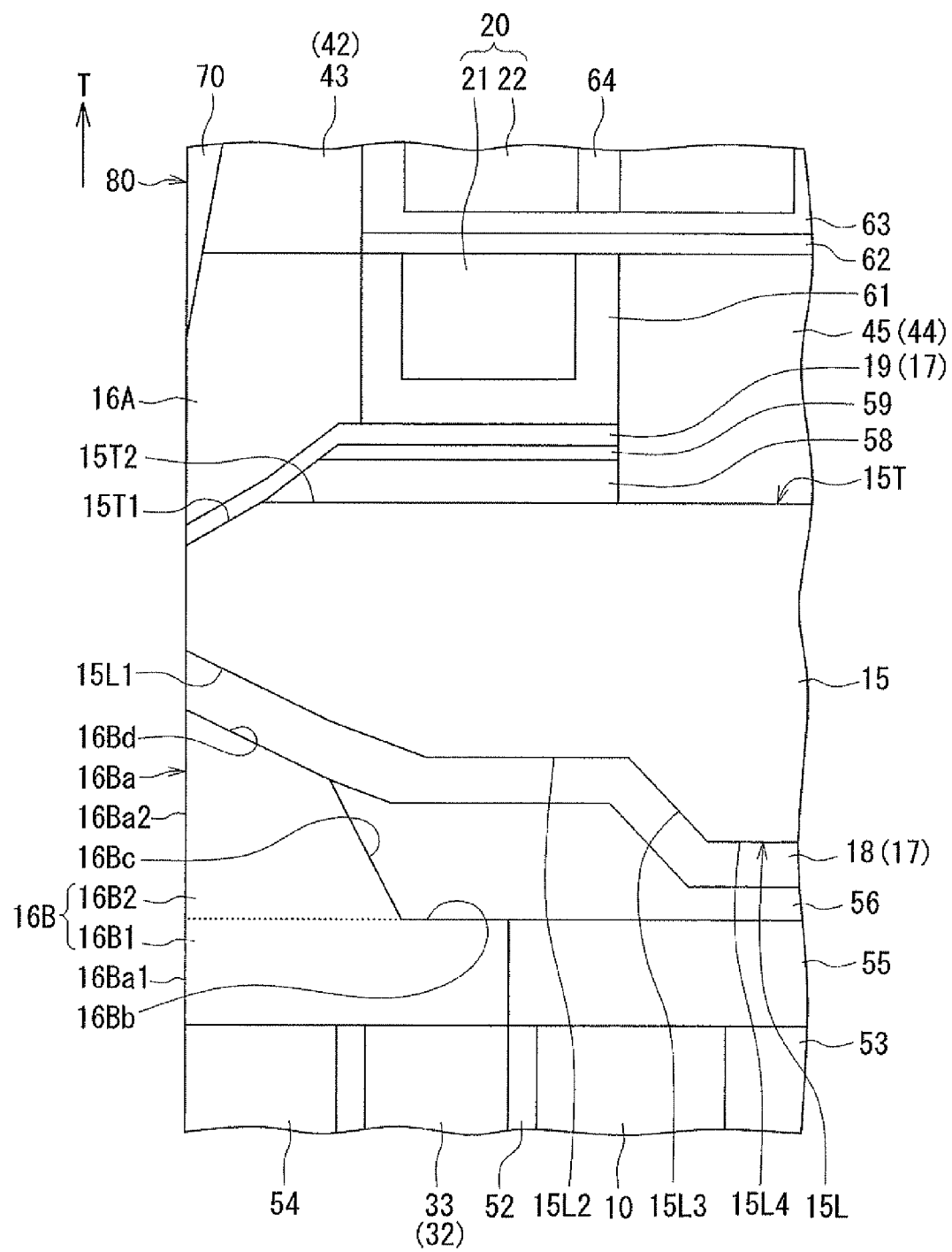
FIG. 18 is a cross-sectional view showing the write shield and a portion of the main pole in the vicinity of the medium facing surface in a first modification example of the magnetic head according to the embodiment of the invention.
Figure 19:
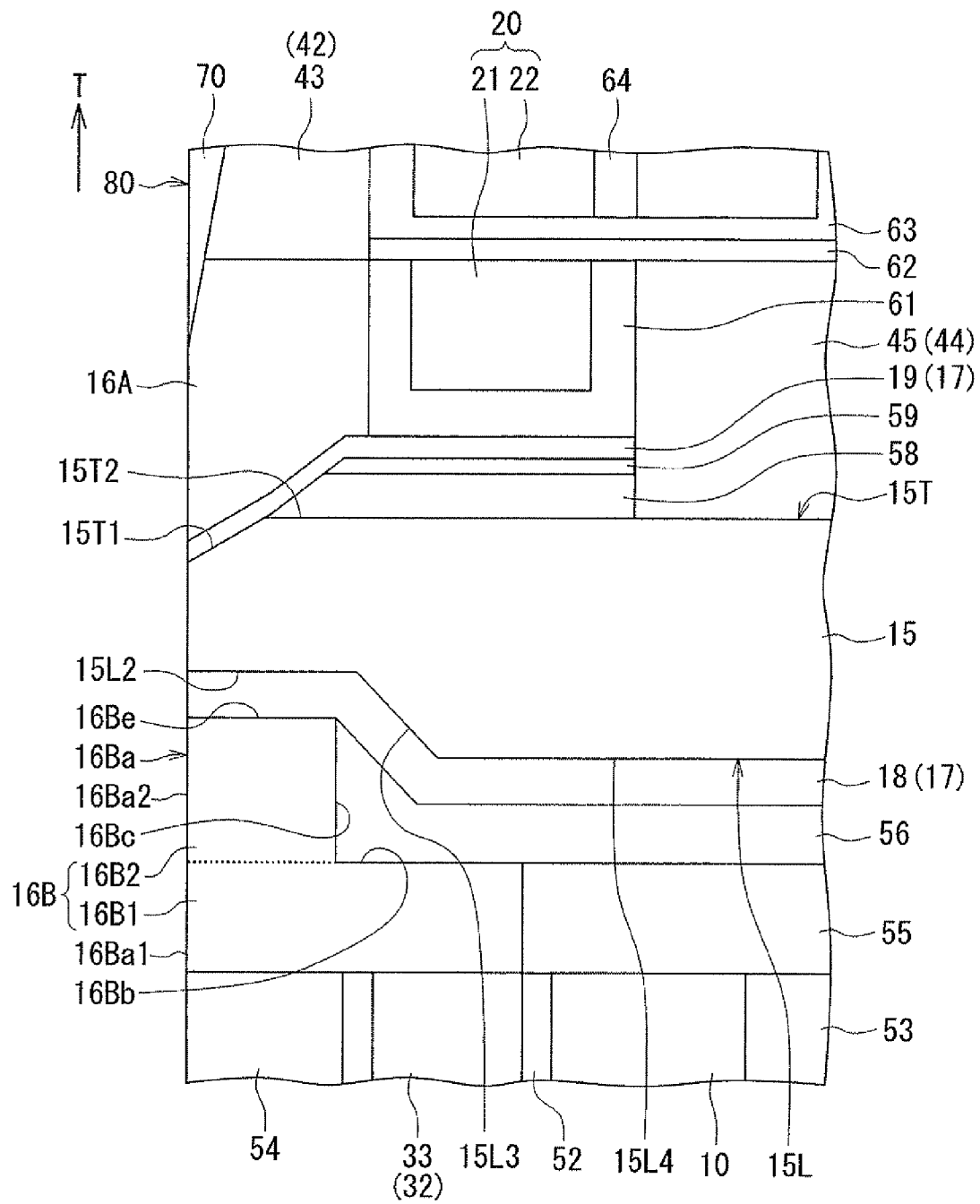
FIG. 19 is a cross-sectional view showing the write shield and a portion of the main pole in the vicinity of the medium facing surface in a second modification example of the magnetic head according to the embodiment of the invention.

First and second modification examples of the magnetic head according to the embodiment will now be described with reference to FIG. 18 and FIG. 19. FIG. 18 is a cross-sectional view showing the write shield and a portion of the main pole in the vicinity of the medium facing surface in the first modification example of the magnetic head according to the embodiment. FIG. 19 is a cross-sectional view showing the write shield and a portion of the main pole in the vicinity of the medium facing surface in the second modification example of the magnetic head according to the embodiment. Note that FIG. 18 and FIG. 19 each show the main cross section.

In the first and second modification examples, the bottom shield 16B of the write shield 16 has a shape different from that shown in FIG. 1. Specifically, in the first and second modification examples, the top surface 16Bb of the base part 16B1 of the bottom shield 16B extends perpendicularly to the medium facing surface 80. The angle θ1 is thus 0°.

Further, in the second modification example, the rear end face 16Bc of the protruding part 16B2 extends parallel to the medium facing surface 80. The angle θ2 is thus 90°. Further, the protruding part 16B2 has a flat surface 16Be in place of the inclined surface 16Bd shown in FIG. 1. The flat surface 16Be extends perpendicularly to the medium facing surface 80 and connects the front end face 16Ba2 and the rear end face 16Bc to each other. In the second modification example, the bottom end 15L of the main pole 15 does not include the first inclined portion 15L1, so that an end of the first flat portion 15L2 of the bottom end 15L is located in the medium facing surface 80.

The present invention is not limited to the foregoing embodiment, and various modifications may be made thereto. For example, of the first and second return path sections 30 and 40, only the first return path section 30 may be provided in the magnetic head.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:
a medium facing surface that faces a recording medium;
a coil that produces a magnetic field corresponding to data to be written on the recording medium;
a main pole that has an end face located in the medium facing surface, the main pole allowing a magnetic flux that corresponds to the magnetic field produced by the coil to pass, and producing a write magnetic field for writing the data on the recording medium;
a write shield made of a magnetic material and having an end face located in the medium facing surface;
a gap part made of a nonmagnetic material and interposed between the main pole and the write shield;
a first return path section made of a magnetic material; and
a substrate having a top surface, wherein:
the coil, the main pole, the write shield, the gap part, and the first return path section are located above the top surface of the substrate;
the write shield includes a bottom shield that is located on a rear side in a direction of travel of the recording medium relative to the main pole;
the bottom shield has an end face that is located in the medium facing surface at a position on the rear side in the direction of travel of the recording medium relative to the end face of the main pole;
the first return path section is located on the rear side in the direction of travel of the recording medium relative to the main pole and interposed between the main pole and the top surface of the substrate, the first return path section connecting the bottom shield and part of the main pole away from the medium facing surface to each other so that a first space is defined by the main pole, the gap part, the bottom shield, and the first return path section;
the coil includes a first portion passing through the first space;
the first return path section includes a yoke layer, a first coupling portion, and a second coupling portion;
the yoke layer is located closer to the top surface of the substrate than is the first space;
the first coupling portion is interposed between the first space and the medium facing surface without being exposed in the medium facing surface, and magnetically couples the bottom shield and the yoke layer to each other;
the second coupling portion is located farther from the medium facing surface than is the first space, and magnetically couples the main pole and the yoke layer to each other;
the bottom shield includes a base part, and a protruding part that protrudes from the base part toward the main pole;
the base part is magnetically connected to the first coupling portion;
in a cross section that intersects the end face of the main pole located in the medium facing surface and that is perpendicular to the medium facing surface and to the top surface of the substrate, the base part is greater than the protruding part in length in a direction perpendicular to the medium facing surface;
the base part has a top surface facing toward the main pole;
the protruding part has a rear end face located opposite to the medium facing surface;
the top surface of the base part is located farther from the medium facing surface than is the rear end face of the protruding part, and is contiguous with the rear end face; and
the rear end face of the protruding part forms an angle relative to the direction perpendicular to the medium facing surface, the angle being greater than an angle that the top surface of the base part forms relative to the direction perpendicular to the medium facing surface.

2. The magnetic head for perpendicular magnetic recording according to claim 1, wherein the angle that the top surface of the base part forms relative to the direction perpendicular to the medium facing surface falls within the range of 0° to 20°, and the angle that the rear end face of the protruding part forms relative to the direction perpendicular to the medium facing surface falls within the range of 50° to 90°.

3. The magnetic head for perpendicular magnetic recording according to claim 1, wherein:
the protruding part further has an inclined surface that is located closer to the medium facing surface than is the rear end face and contiguous with the rear end face; and
the inclined surface forms an angle relative to the direction perpendicular to the medium facing surface, the angle being smaller than the angle that the rear end face forms relative to the direction perpendicular to the medium facing surface.

4. The magnetic head for perpendicular magnetic recording according to claim 3, wherein the angle that the top surface of the base part forms relative to the direction perpendicular to the medium facing surface falls within the range of 0° to 20°, the angle that the rear end face of the protruding part forms relative to the direction perpendicular to the medium facing surface falls within the range of 50° to 65°, and the angle that the inclined surface of the protruding part forms relative to the direction perpendicular to the medium facing surface falls within the range of 30° to 45°.

5. The magnetic head for perpendicular magnetic recording according to claim 1, wherein:
the write shield further includes a top shield;
the top shield has an end face that is located in the medium facing surface at a position on a front side in the direction of travel of the recording medium relative to the end face of the main pole;
the magnetic head further comprises a second return path section made of a magnetic material;
the second return path section is located on the front side in the direction of travel of the recording medium relative to the main pole, and connects the top shield and part of the main pole away from the medium facing surface to each other so that a second space is defined by the main pole, the gap part, the top shield, and the second return path section; and
the coil further includes a second portion passing through the second space.

6. The magnetic head for perpendicular magnetic recording according to claim 1, wherein:
the write shield further includes first and second side shields and a top shield;
the first and second side shields have two end faces that are located in the medium facing surface at positions on opposite sides of the end face of the main pole in a track width direction; and
the top shield has an end face that is located in the medium facing surface at a position on a front side in the direction of travel of the recording medium relative to the end face of the main pole.

7. A method of manufacturing the magnetic head for perpendicular magnetic recording of claim 1, comprising the steps of:
forming the first return path section; forming the coil; forming the main pole; forming the write shield; and forming the gap part, wherein:
the step of forming the write shield includes the step of forming the bottom shield; and
the step of forming the bottom shield includes the steps of:
forming a magnetic layer; and
etching the magnetic layer so as to provide the magnetic layer with the top surface of the base part and the rear end face of the protruding part so that the magnetic layer becomes the bottom shield.

8. The method of manufacturing the magnetic head for perpendicular magnetic recording according to claim 7, wherein the angle that the top surface of the base part forms relative to the direction perpendicular to the medium facing surface falls within the range of 0° to 20°, and the angle that the rear end face of the protruding part forms relative to the direction perpendicular to the medium facing surface falls within the range of 50° to 90°.

9. The method of manufacturing the magnetic head for perpendicular magnetic recording according to claim 7, wherein:
the protruding part further has an inclined surface that is located closer to the medium facing surface than is the rear end face and contiguous with the rear end face;
the inclined surface forms an angle relative to the direction perpendicular to the medium facing surface, the angle being smaller than the angle that the rear end face forms relative to the direction perpendicular to the medium facing surface; and
the step of etching the magnetic layer provides the magnetic layer with the inclined surface of the protruding part in addition to the top surface of the base part and the rear end face of the protruding part.

10. The method of manufacturing the magnetic head for perpendicular magnetic recording according to claim 9, wherein the angle that the top surface of the base part forms relative to the direction perpendicular to the medium facing surface falls within the range of 0° to 20°, the angle that the rear end face of the protruding part forms relative to the direction perpendicular to the medium facing surface falls within the range of 50° to 65°, and the angle that the inclined surface of the protruding part forms relative to the direction perpendicular to the medium facing surface falls within the range of 30° to 45°.

* * * * *